US012008686B2

United States Patent
Hazen et al.

(10) Patent No.: US 12,008,686 B2
(45) Date of Patent: *Jun. 11, 2024

(54) AUGMENTED REALITY MAP CURATION

(71) Applicant: Magic Leap, Inc., Plantation, FL (US)

(72) Inventors: Griffith Buckley Hazen, San Francisco, CA (US); Amy DeDonato, Maumee, OH (US); Ali Shahrokni, San Jose, CA (US); Ben Weisbih, Rehovot (IL); Vinayram Balakumar, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,615

(22) Filed: Nov. 21, 2022

(65) Prior Publication Data
US 2023/0162411 A1 May 25, 2023

Related U.S. Application Data

(63) Continuation of application No. 17/153,720, filed on Jan. 20, 2021, now Pat. No. 11,574,424.
(Continued)

(51) Int. Cl.
*G06F 3/01* (2006.01)
*G06T 3/60* (2006.01)
(Continued)

(52) U.S. Cl.
CPC ............ *G06T 11/001* (2013.01); *G06F 3/011* (2013.01); *G06T 3/60* (2013.01); *G09B 29/106* (2013.01); *G06T 2200/24* (2013.01)

(58) Field of Classification Search
CPC ..... G06T 11/001; G06T 3/60; G06T 2200/24; G06F 3/011; G06F 3/04815; G09B 29/106; G06V 40/19
See application file for complete search history.

(56) References Cited

U.S. PATENT DOCUMENTS

| 6,850,221 B1 | 2/2005 | Tickle |
| 2002/0129094 A1 | 9/2002 | Reisman |

(Continued)

FOREIGN PATENT DOCUMENTS

| EP | 3137976 B1 | 11/2017 |
| WO | WO 2019212698 A1 | 11/2019 |
| WO | WO 2021154558 A1 | 8/2021 |

OTHER PUBLICATIONS

International Search Report and Written Opinion for PCT Application No. PCT/US21/14138, mailed Apr. 7, 2021.
(Continued)

*Primary Examiner* — Abdul-Samad A Adediran
(74) *Attorney, Agent, or Firm* — Seed IP Law Group LLP

(57) ABSTRACT

An augmented reality device may communicate with a map server via an API interface to provide mapping data that may be implemented into a canonical map, and may also receive map data from the map server. A visualization of map quality, including quality indicators for multiple cells of the environment, may be provided to the user as an overlay to the current real-world environment seen through the AR device. These visualizations may include, for example, a map quality minimap and/or a map quality overlay. The visualizations provide guidance to the user that allows more efficient updates to the map, thereby improving map quality and localization of users into the map.

20 Claims, 16 Drawing Sheets

Related U.S. Application Data

(60) Provisional application No. 62/966,267, filed on Jan. 27, 2020.

(51) Int. Cl.
  *G06T 11/00* (2006.01)
  *G09B 29/10* (2006.01)

(56) References Cited

U.S. PATENT DOCUMENTS

| | | |
|---|---|---|
| 2006/0028436 A1 | 2/2006 | Armstrong |
| 2007/0081123 A1 | 4/2007 | Lewis |
| 2009/0089149 A1 | 4/2009 | Lerner et al. |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0005229 A1 | 1/2016 | Lee et al. |
| 2016/0011419 A1 | 1/2016 | Gao |
| 2016/0026253 A1 | 1/2016 | Bradski et al. |
| 2016/0246061 A1 | 8/2016 | Bickerstaff et al. |
| 2017/0068323 A1 | 3/2017 | West et al. |
| 2019/0392643 A1* | 12/2019 | Busto .............. G06V 40/19 |
| 2020/0249749 A1* | 8/2020 | Akman ............ G06F 3/04815 |

OTHER PUBLICATIONS

ARToolKit: https://web.archive.org/web/20051013062315/http://www.hitl.washington.edu:80/artoolkit/documentaion/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/-azuma/ARpresence.pdf.

Azuma, "Predictive Tracking for Augmented Realty," TR95-007, Department of Computer Science, UNG-Chapel Hill, NC, Feb. 1995, 262 pages.

Bimber, et al., "Spatial Augmented Reality—Merging Real and Virtual Worlds," 2005 https://web.media.mit.edu/-raskar/book/BimberRaskarAugmentedRealityBook.pdf.

Jacob, "Eye Tracking in Advanced Interface Design," Human-Computer Interaction Lab Naval Research Laboratory, Washington, D.C. /paper/ in Virtual Environments and Advanced Interface DesiQn, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

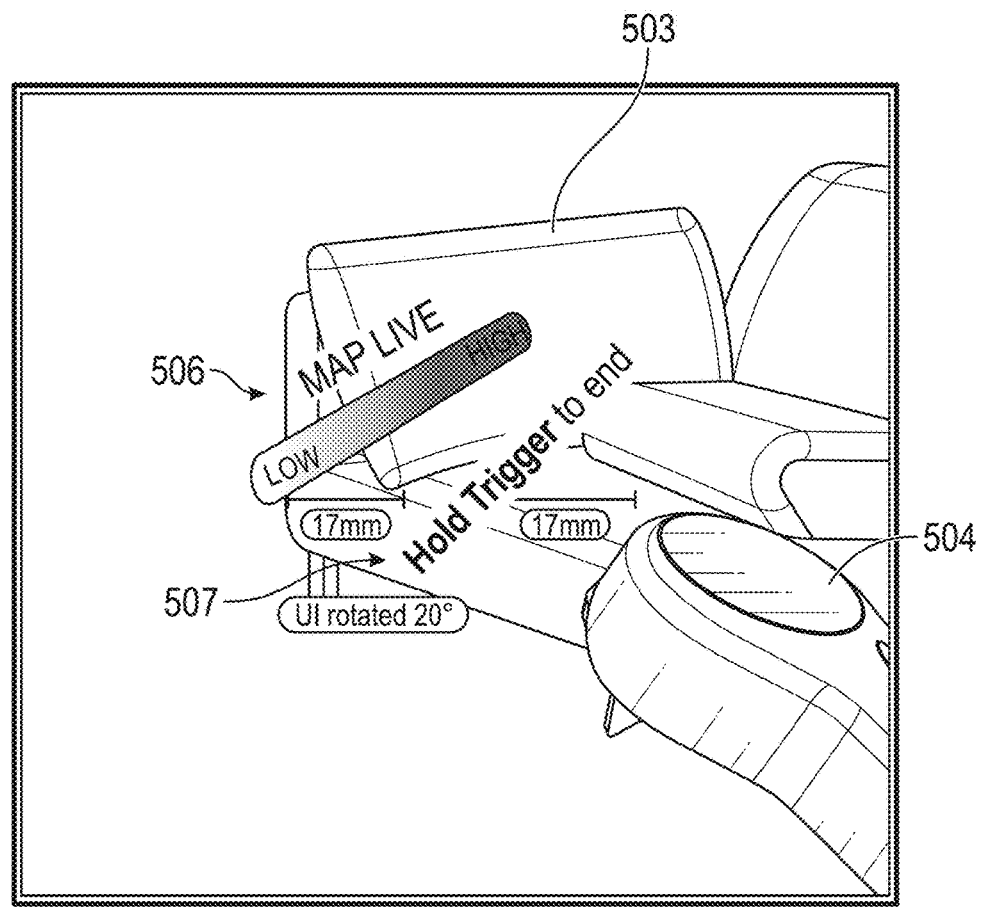
FIG. 5C1
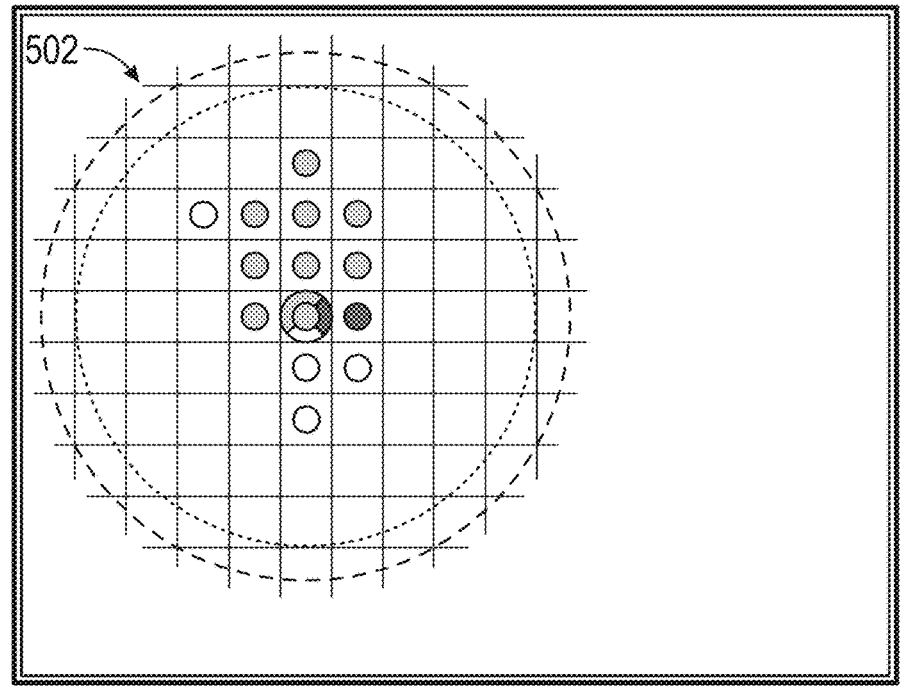
FIG. 5C2

AUGMENTED REALITY MAP CURATION

This application is a continuation of U.S. patent application Ser. No. 17/153,720, filed Jan. 20, 2021, which claims the benefit of U.S. Provisional Application No. 62/966,267, filed, Jan. 27, 2020, the contents of which are incorporated herein by reference in their entirety.

FIELD

The present disclosure relates to virtual reality and augmented reality, including mixed reality, imaging and visualization systems and more particularly to systems and methods for displaying and interacting with virtual content.

BACKGROUND

Modern computing and display technologies have facilitated the development of systems for so called "virtual reality "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

SUMMARY

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

An augmented reality device may communicate with a map server via an API interface to provide mapping data that may be implemented into a canonical map, and may also receive map data from the map server. A visualization of map quality, including quality indicators for multiple cells of the environment, may be provided to the user as an overlay to the current real-world environment seen through the AR device. These visualizations may include, for example, a map quality minimap and/or a map quality overlay. The visualizations provide guidance to the user that allows more efficient updates to the map, thereby improving map quality and localization of users into the map.

BRIEF DESCRIPTION OF THE DRAWINGS

FIG. 5C1 illustrates another view of the controller UI and associated map information.

FIG. 5C2 is a top view of the example minimap.

Figure 1:
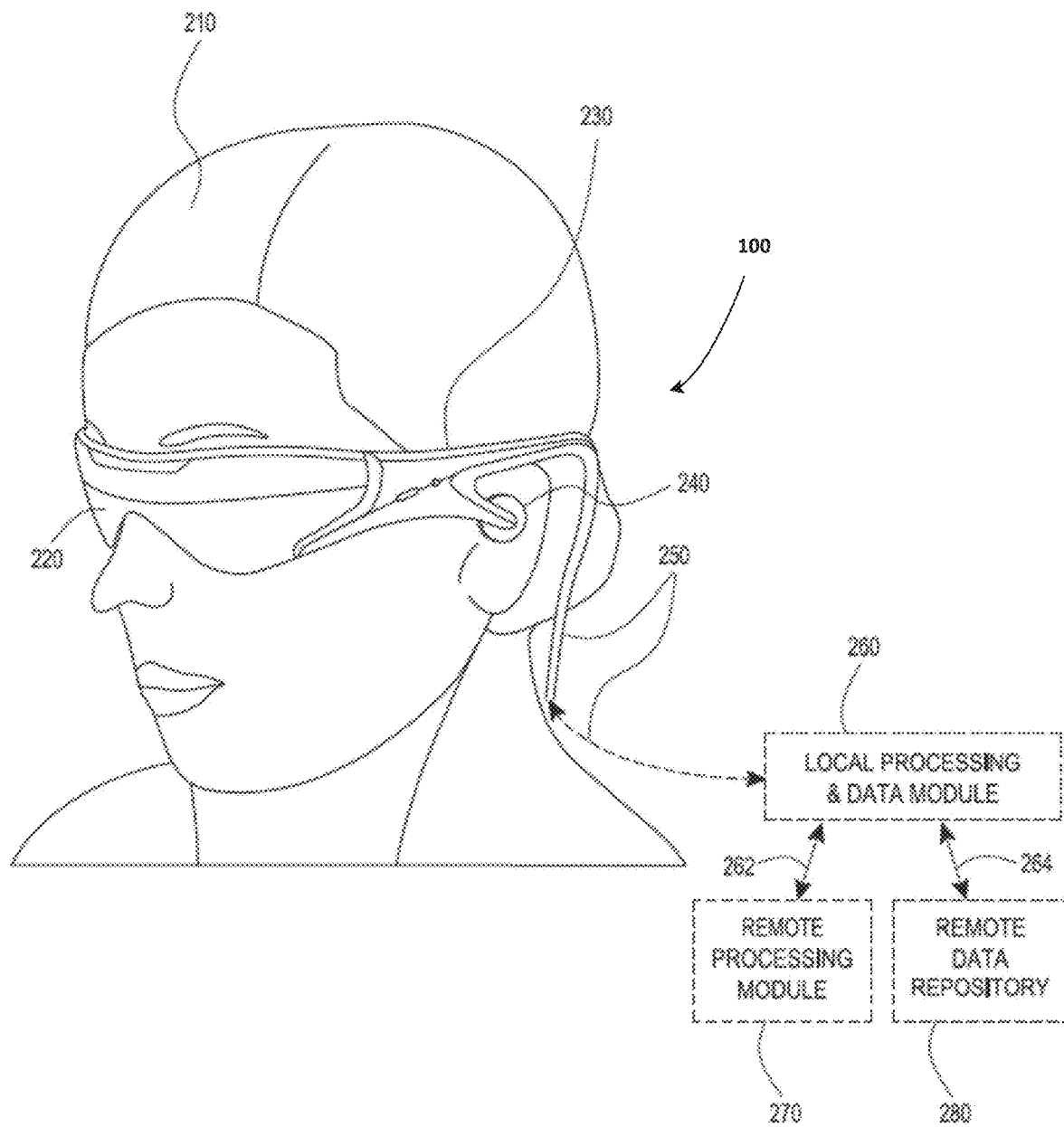
FIG. 1 illustrates an example of an AR device which can be configured to provide an AR/VR/MR scene.

Throughout the drawings, reference numbers may be re-used to indicate correspondence between referenced elements. The drawings are provided to illustrate example implementations described herein and are not intended to limit the scope of the disclosure.

DETAILED DESCRIPTION

Embodiments of the present disclosure are directed to devices, systems, and methods for facilitating virtual or augmented reality interaction. As one example embodiment, one or more user input devices may be used to interact in a VR. AR or MR session. Such sessions may include virtual elements or objects in a three-dimensional space. The one or more user input devices may further be used for pointing, selecting, annotating, and drawing, among other actions on virtual objects, real objects or empty space in an AR or MR session. For ease of reading and understanding, certain systems and methods discussed herein refer to an augmented reality environment and other "augmented reality" or "AR" components, such as an "AR device" or "AR system." These descriptions of augmented reality" or "AR" should be construed to include "mixed reality," "virtual reality," "VR," "MR," and the like, as if each of those "reality environments" were specifically mentioned also.

Overview

In order to facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms, wherein such construction is consistent with context of the term. Thus, the descriptions below do not limit the meaning of these terms, but only provide example descriptions.

Canonical map: a map that may be useable by multiple AR and non-AR (e.g., smart phones) devices. A canonical map may synchronize a common set of Persistence Coordinate Frames (PCFs) between devices, thereby enabling multi-user experiences. In some embodiments, the canonical map may be dynamically updated over time by one or more users, and may represent a digital replica of the real world.

Tracking map: generally a local map that is used by a particular AR or non-AR device, although a tracking map may be shared among multiple users (e.g., at a common location) and may be used to generate and/or update a canonical map that is available to multiple users.

Localization: determining location within a map based on matching sensor inputs (e.g., images from forward facing cameras of a headset) to corresponding map data. For example, the AR system may process images from the camera(s) to determine if features in the images match with certain features in a map. If a match is found, the AR system may then determine the position and orientation of the user based on the matched features.

Cell Quality Subscores: indicate an amount of map data associated with a particular viewing direction that is usable to localize a user into the determined cell.

Cell Saturation Indicator: indicates whether the user has been positioned within the determined cell for at least a threshold time period.

Cell score: indicates a likelihood of localization into the cell, which may be determined based on cell quality subscores and cell saturation indicator.

Application Programming Interfaces (APIs): an API is generally a defined communication channel, protocol, settings, etc. that allows two devices to exchange information between one another in a more direct manner than might otherwise be possible. In some embodiments, an API registration module may be configured to register individual devices (e.g. AR devices, computing devices, Internet of things devices, sensors, etc.) for communication with a particular computing device (e.g., a central server that receives, processes, stores, provides, information to the individual devices) by issuing a token to the individual devices that authorizes such direct communications. Thus, a computing system may establish secure and direct communication channels with multiple devices via APIs.

Example AR System

An AR device (also referred to herein as an augmented reality (AR) system), such as the example discussed below with reference to FIG. 1, can be configured to present 2D or 3D images of virtual objects to a user. The images may be still images, frames of a video, or a video, in combination or the like. For the purpose of the present disclosure, the term "AR" is used interchangeably with the term "MR" or "VR".

FIG. 1 illustrates an example of an AR device 100 which can be configured to provide an AR/VR/MR scene. The AR device 100 can also be referred to as the AR system 100. The AR device 100 includes a display 220, and various mechanical and electronic modules and systems to support the functioning of display 220. The display 220 may be coupled to a frame 230, which is wearable by a user 210 (which may also be referred to herein as a wearer or viewer). The display 220 can be positioned in front of the eyes of the user 210. The display 220 can present AR/VR/MR content to a user. The display 220 can comprise a head mounted display (HMD) that is worn on the head of the user.

In some implementations, a speaker 240 is coupled to the frame 230 and positioned adjacent the ear canal of the user (in some implementations, another speaker, not shown, is positioned adjacent the other ear canal of the user to provide for stereo/shapeable sound control). The display 220 can include an audio sensor (e.g., a microphone) for detecting an audio stream from the environment and/or capture ambient sound. In some implementations, one or more other audio sensors, not shown, are positioned to provide stereo sound reception. Stereo sound reception can be used to determine the location of a sound source. The AR device 100 can perform voice or speech recognition on the audio stream.

The AR device 100 can include an outward-facing imaging system which observes the world in the environment around the user. The AR device 100 can also include an inward-facing imaging system which can track the eye movements of the user. The inward-facing imaging system may track either one eye's movements or both eyes' movements. The inward-facing imaging system may be attached to the frame 230 and may be in electrical communication with the processing modules 260 and/or 270, which may process image information acquired by the inward-facing imaging system to determine, e.g., the pupil diameters or orientations of the eyes, eye movements or eye pose of the user 210. The inward-facing imaging system may include one or more cameras or other imaging devices. For example, at least one camera may be used to image each eye. The images acquired by the cameras may be used to determine pupil size or eye pose for each eye separately, thereby allowing presentation of image information to each eye to be dynamically tailored to that eye.

As an example, the AR device 100 can use the outward-facing imaging system or the inward-facing imaging system to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and/or storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 270 and remote data repository 280 may be operatively coupled to each other.

In some implementations, the remote processing module 270 may comprise one or more processors configured to analyze and process data or image information. In some implementations, the remote data repository 280 may comprise a digital data storage facility, which may be available through the internet or other networking configuration in a "cloud" resource configuration. In some implementations, all data is stored and all computations (e.g., AR processes discussed herein) are performed in the local processing and data module, allowing fully autonomous use from a remote module. In other implementations, some or all of the computations of certain AR processes discussed herein are performed remotely, such as at a network-connected server.

The AR device may combine data acquired by a GPS and a remote computing system (such as, e.g., the remote processing module 270, another user's AR Device, etc.) which can provide more information about the user's environment. As one example, the AR device can determine the user's location based on GPS data and retrieve a world map (that may be shared by multiple users) including virtual objects associated with the user's location.

In many implementations, the AR device may include other components in addition or in alternative to the components of the AR device described above. The AR device may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The AR device may, for example, include one or more physical objects which are manipulable by the user to allow input or interaction with the AR device. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the AR device may render a user interface so as to appear to a user to be on one or more surfaces of the totem. For example, the AR device may render an image of a computer keyboard and trackpad to appear to reside on one or more surfaces of a totem. For example, the AR device may render a virtual computer keyboard and virtual trackpad to appear on a surface of a thin rectangular plate of aluminum which serves as a totem. The rectangular plate does not itself have any physical keys or trackpad or sensors. However, the AR device may detect user manipulation or interaction or touches with the rectangular plate as selections or inputs made via the virtual keyboard or virtual trackpad. The user input device 466 (shown in FIG. 4) may be an implementation of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the AR device or other users.

Examples of haptic devices and totems usable with the AR devices. HMD, and display systems of the present disclosure are described in U.S. Patent Publication No. 2015/0016777, which is incorporated by reference herein in its entirety.

The example components depicted and/or described above with reference to FIG. 1 are for illustration purposes only. Multiple sensors and other functional modules are shown together for ease of illustration and description. Some implementations may include only one or a subset of these sensors or modules. Further, the locations of these components are not limited to the positions depicted in FIG. 1. Some components may be mounted to or housed within other components, such as a belt-mounted component, a hand-held component, or a helmet component.

Examples of Mapping a User's Environment

Figure 2:
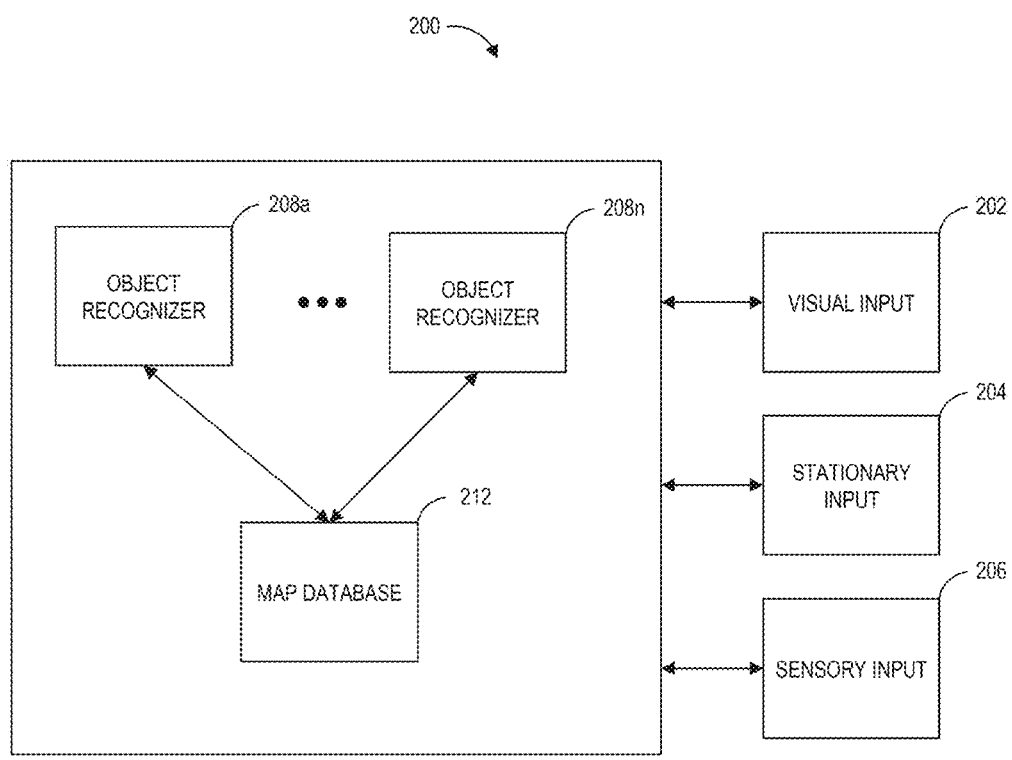
FIG. 2 is a block diagram of an example of an AR environment.

FIG. 2 is a block diagram of an example of an AR environment 200. The AR environment 200 may be configured to receive input (e.g., visual input 202 from an AR device, stationary input 204 such as room cameras, sensory input 206 from various sensors, gestures, totems, eye tracking, user input from the AR device, etc.) from one or more user AR devices (e.g., AR device 100) or stationary room systems (e.g., room cameras, etc.). The AR devices can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 208 can crawl through the received data (e.g., the collection of points) and recognize or map points, tag images, attach semantic information to objects with the help of a map database 212. The map database 212 may comprise various points collected over time and their corresponding objects. The various devices and the map database can be connected to each other through a network (e.g., LAN, WAN, etc.) to access the cloud.

Based on this information and collection of points in the map database, the object recognizers 208a to 208n may recognize objects in an environment. For example, the object recognizers can recognize faces, persons, windows, walls, user input devices, televisions, documents (e.g., travel tickets, drivers license, passport as described in the security examples herein), other objects in the user's environment, etc. One or more object recognizers may be specialized for object with certain characteristics. For example, the object recognizer 208a may be used to recognizer faces, while another object recognizer may be used recognize documents.

The object recognitions may be performed using a variety of computer vision techniques. For example, the AR device can analyze the images acquired by the outward-facing imaging system to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some implementations, individual models can be customized for individual data sets. For example, the AR device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some implementations, the wearable HMD can be configured to utilize a plurality of techniques to generate models for analysis of the aggregated data. Other techniques may include using pre-defined thresholds or data values.

Based on this information and collection of points in the map database, the object recognizers 208a to 208n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more AR devices. For example, the AR environment 200 may include information about a scene happening in California. The environment 200 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 200 may also use a topological map for localization purposes.

Example Mao API Setup

Figure 3:
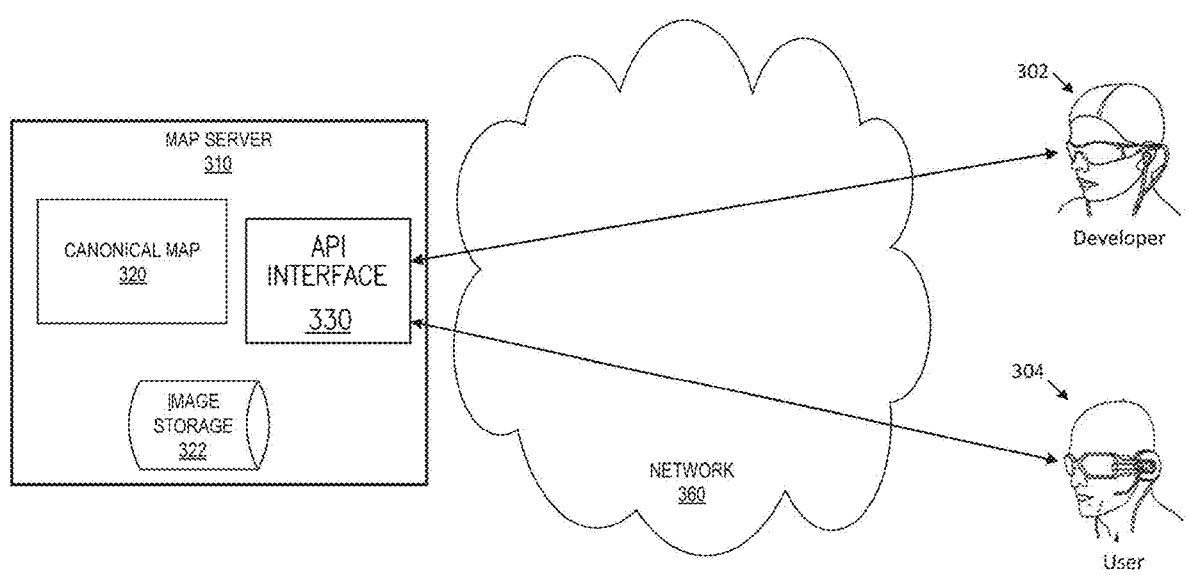
FIG. 3 is a block diagram illustrating an example the data flow between multiple users and a map server.

FIG. 3 is a block diagram illustrating an example data flow between multiple users and a map server 310 (also referred to as a "cloud server" or simply the "cloud"). In this example, and API interface 330 is implemented to allow more direct and efficient communication between the users 302, 304, and the map server 310. In some embodiments, the map server 310 may be part of the remote processing and data module 260 (FIG. 1), or the map server 310 may be a separate cloud server that is accessible to multiple users.

As shown in the example of FIG. 3, a developer 302 may communicate with the map server 310 to provide mapping data that may be implemented into the canonical map 320, and may also receive map data from the map server 310 via the API interface 330 that may be displayed to the developer 302 and/or used to guide the developer in acquiring additional mapping data. Similarly, a user 304, such as a consumer that purchases an AR device, may also interface with the map server 310 via the API interface 330 to both provide additional map data to the map server 310 and to receive map data from the map server 310.

In the example of FIG. 3, the map server 310 also includes image storage 322, which may include images acquired from various sources (e.g., AR devices) that are linked with associated portions of the canonical map 320.

In some embodiments, the map server 310 is configured to evaluate map data from multiple entities (e.g., multiple users) for quality of the map data and then to merge high quality map data with any existing map data in a canonical map (e.g., promoting a tracking map into a canonical map). For example, multiple users may be in a common environment and transmitting images to the map server 310. In some embodiments, integration of map data from multiple users is performed in real-time, such that each of the users can benefit from an increased map quality. In some embodiments, map quality is updated separately in each AR device based on images obtained by the AR device, and merged with other users image data as part of the canonical map, on a periodic basis (e.g., nightly). Thus, each AR device may make use of an improved quality map immediately, and a potentially even higher quality map later as the map server integrates map data from other users.

Example Map Creation Process

Figure 4:
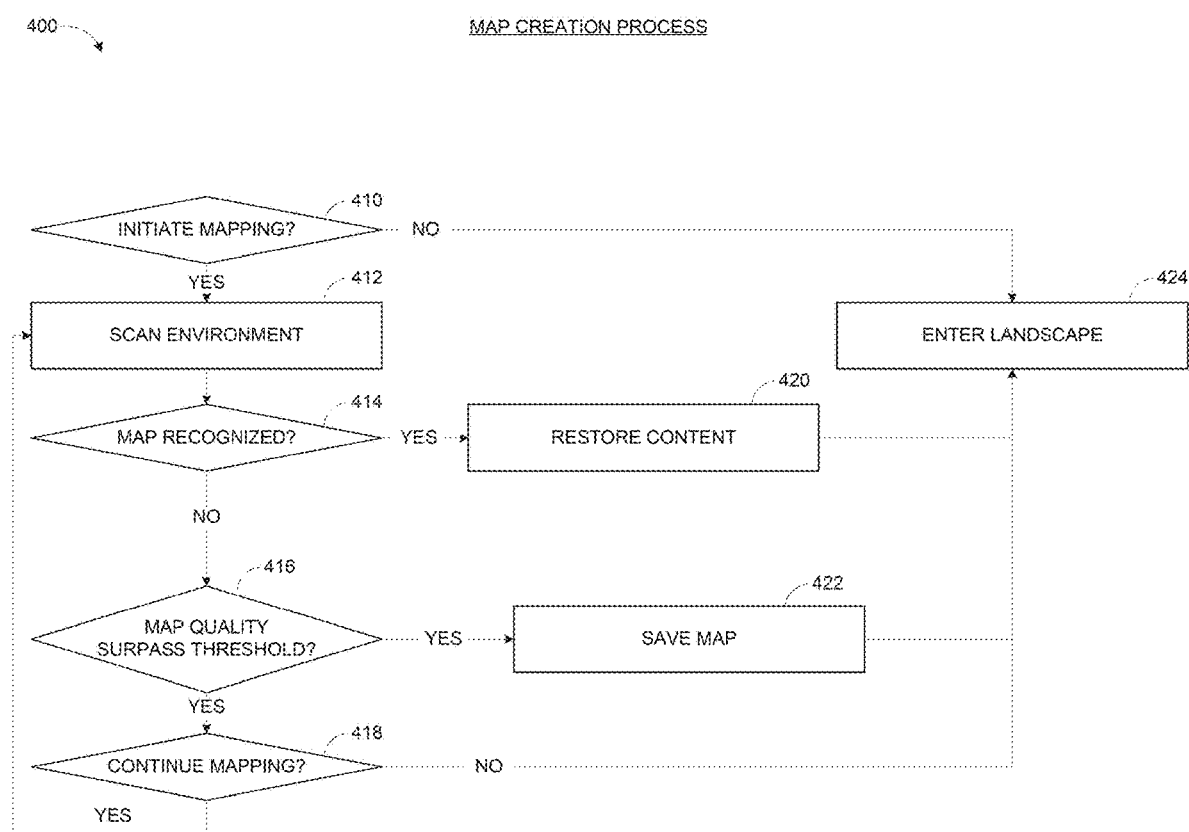
FIG. 4 is a flowchart illustrating one embodiment of a map creation process.

A user, such as the developer 302 or user 304, may create a map of an environment, such as if the user has not previously interacted with or visited their current environment, not previously scanned their current environment, or the AR system fails to recognize the users environment. FIG. 4 illustrates an example flowchart of a map creation process 400. In some embodiments, even if the user is able to relocalize into an existing map, a process similar to FIG. 4 may be implemented to improve the current map (e.g., by transmitting additional data at block 422, as discussed below). Additionally, even if the user is not in an immersive flow designed to help the user gather data for improving the map, the AR device may still perform some or all of the process of FIG. 4, such as to provide background transmission of mapping data to the cloud that may be used to update a canonical map, for example.

At the mapping initiation block 410, the AR system can determine whether to initiate scanning or mapping of the environment of the user. For example, the AR system can determine whether an initiation condition is met to begin scanning the environment. In some examples, the initiation condition can include the system detecting movement of the user into a new and/or unfamiliar location, inputs from one or more sensors, and/or a user input. The user input can include an affirmative or negative response to one or more prompts. The one or more prompts may differ based on any number of AR system conditions, such as whether the user is a new user or an existing user, whether the user has previously scanned their environment to create a map or not, or the type of program used to initiate the prompt. As another example, a developer 302 may enter a mapping workflow in a different manner than a user 304. For example, a developer 302 may initiate a mapping process of a new environment associated with a software application being developed by the developer, such as to allow the developer 302 to explore the environment and gather sensor data usable to build a map of the environment.

In some embodiments, when a user enters a mapping process, such as via block 410 of FIG. 4, a welcome user interface may be presented. The welcome interface can include a dialog prompting a user to scan or continue to scan the user's environment. In some examples, the welcome interface can receive a user input and the AR system can initiate or not initiate scanning based on that user input. Additionally or alternatively, the AR system may move the user to another prompt based on the user input.

At the scanning block 412, the AR system can initiate a scanning process, which may include providing guidance to the user of areas in the environment for which additional images should be obtained. In some embodiments, the scanning process may be a process having gamified elements to help direct the user to move around their environment and collect data in their space. For example, the AR system may generate and display one or more graphics (also referred to as waypoints) around the user's environment and direct the user to interact with the graphics until an end criteria is met. As used herein, a waypoint may refer to a particular location within a map and/or to a graphic (or other indication) of the particular location within the map. Thus, a waypoint may include a graphic that marks the particular location within the map and/or that directs the user towards the waypoint location. During the user's interaction with the one or more graphics, the AR system may collect data about the user's environment.

In some examples, the AR system may check whether a user's environment is known or recognized at a map recognition block 414. The AR system may perform this check during or after the scanning block 412. For example, the AR system may perform a scanning process at block 412 and the AR system may check at intervals during the scanning process whether the user's environment matches a known environment (e.g., the AR system can match one or more PCFs found in the user's current environment with one or more PCFs in a saved map of a user). If a map is recognized by the AR system, the AR system can restore AR content associated with the recognized map at block 420 before entering the landscape at block 424. If a map is not recognized by the AR system, the system can check a map quality at block 416.

At the map quality block 416, the AR system can check whether a map generated based on the data collected during scanning block 412 (and/or combined with data stored in the virtual world map) is of a high enough quality to provide a quality user experience during the current and/or future use. The quality criteria can be any suitable criteria for assessing map quality, such as number of keyframes, PCFs, or other data associated with a mesh in the user's environment or other map characteristic. For example, the AR system may determine whether enough PCFs have been found or generated based on the collected data to make the user's space identifiable in future scanning. The number of PCFs may be a suitable number, such as one, two, three, or five PCFs in the user's environment. However, other numbers may also be possible. For example, the number of PCFs necessary for a particular environment may be dynamically determined by the AR system, such as based on analysis of the gathered scanning data and/or map data previously associated with the environment. Once the AR system has determined that the map passes the quality threshold, the AR system may save the map using the collected data at block 422. Further discussion and examples of map quality determinations are provided below.

At the save block 422, the AR system may save the map to a remote or local memory for retrieval by the user or a third party. For example, the AR system of user 304 (FIG. 3) may transmit map data obtained from the AR system of the user 304 to the map server 310 via an API interface 330. Additionally or alternatively, the system may prompt the user to input other information associated with the map to be stored as metadata with the map, such as a name or geophysical location.

If the map quality is not sufficient to provide a quality user experience, the AR system can determine if the user would like to continue scanning or mapping the user's environment at the decision block 418. For example, the AR system can prompt the user to continue scanning or stop the scanning process. The AR system may receive user input as a response to the prompt and continue scanning the environment at block 412 or enter the landscape at block 424.

Additionally or alternatively, the AR system can stop the map creation process 400 at any point and enter the landscape at block 424. For example, the user can input an exit or skip command during the scan process at block 412. The AR system can then abort the scanning process at block 412 or enter the landscape at block 424.

Example Map Curation

Figure 5A:
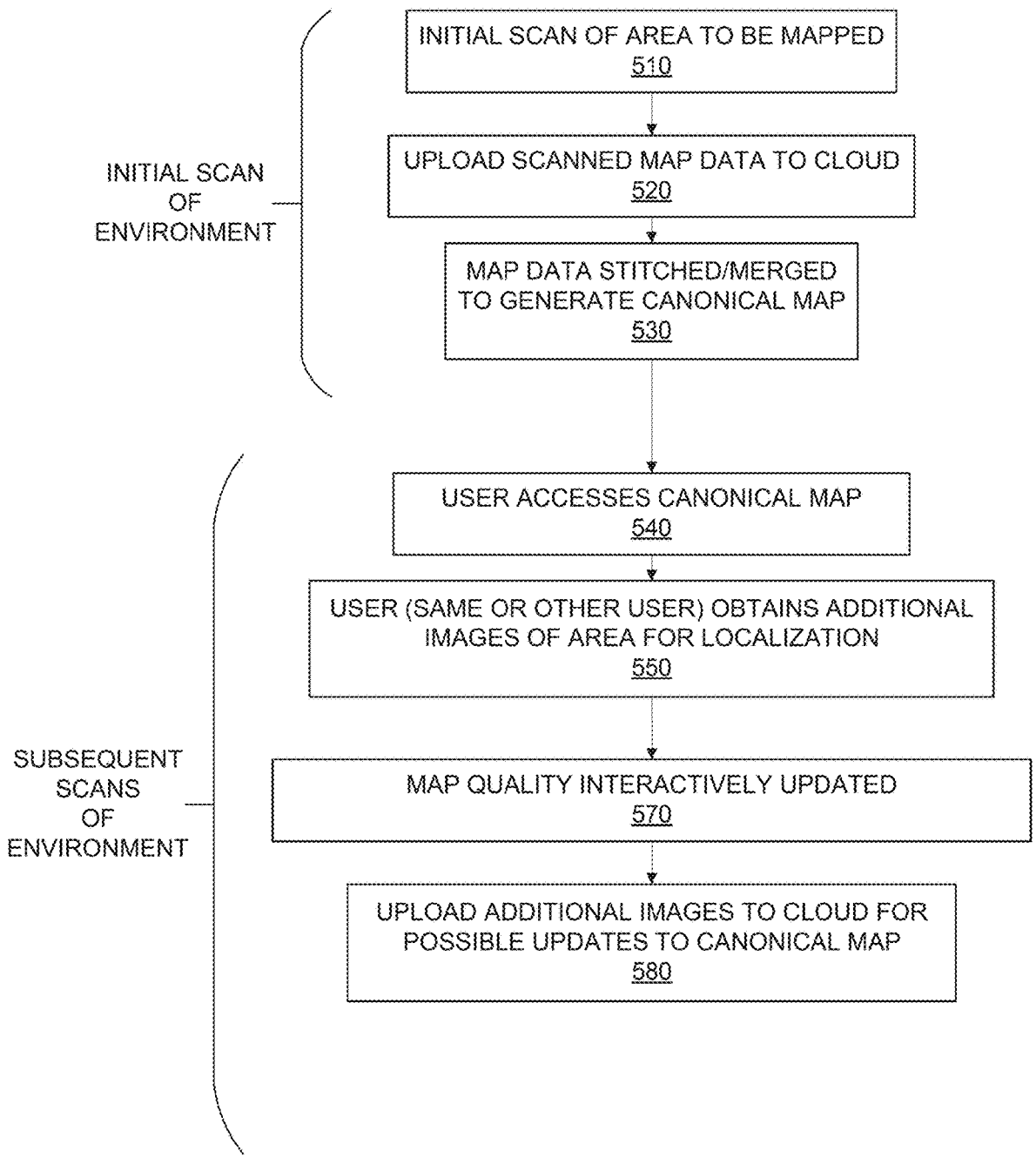
FIG. 5A is a flowchart illustrating one embodiment of a process for curating a map, such as may be performed by a developer or user.

FIG. 5A is a flowchart illustrating one embodiment of a process for curating a map, such as may be performed by a developer 302 or user 304. In general, the map curation process, as discussed herein, provides a workflow and guidance to a user that optimizes the gathering of sensory data (e.g. image data within an environment to be mapped) for improving quality of a map. In some embodiments, communication between users (e.g., either the developer 302 or consumer user 304) may occur via an API communication channel, such as is illustrated in FIG. 3. As discussed further below, real-time map quality data may be calculated and provided to the user as part of the map curation process. For example, map visualizations that guide users to areas of an environment (e.g., a real-world space to be mapped) that currently have a low map quality may be displayed in an AR device Improvements in map quality provide a more realistic and repeatable experience for users. For example, as the quality of maps increases, digital content that is attached to the real world is better persisted between sessions of a particular user or between multiple users. Another possible benefit of having higher quality maps is that end users entering the area could localize into the map more quickly and with a higher probability, and from more vantage points depending on where specifically in the are the map quality was improved.

Figure 5B:
FIG. 5B illustrates an example user interface may be provided upon startup of a map curation tool.

In one embodiment, a welcome screen may be provided to the developer that allows selection of either a guided setup or a map creation mode. For example, FIG. 5B illustrates an example user interface may be provided upon startup of a map curation tool. Upon selection of a map creation or improvement mode (e.g., the "Create Map" button in the user interface of Figure SB or an "improve" button in embodiments where at least some map data associated with the environment is already stored in the cloud or elsewhere), a visualization of map quality may be provided to the user as an overlay to the current real-world environment seen through the AR device. These visualizations may include, for example, a map quality minimap and/or a map quality overlay. Additional visual components that may be usable in further developing the map may be displayed, such as a mesh, PCFs, and the like. While in some embodiments the map creation mode is entered to initially build a map, the map creation (or improvement) mode may also be selected when the user is providing data for improving an already existing map (e.g., that may have very little existing map data). As discussed further below, the new map data may be merged with any existing cloud/canonical map.

Figure 5C:
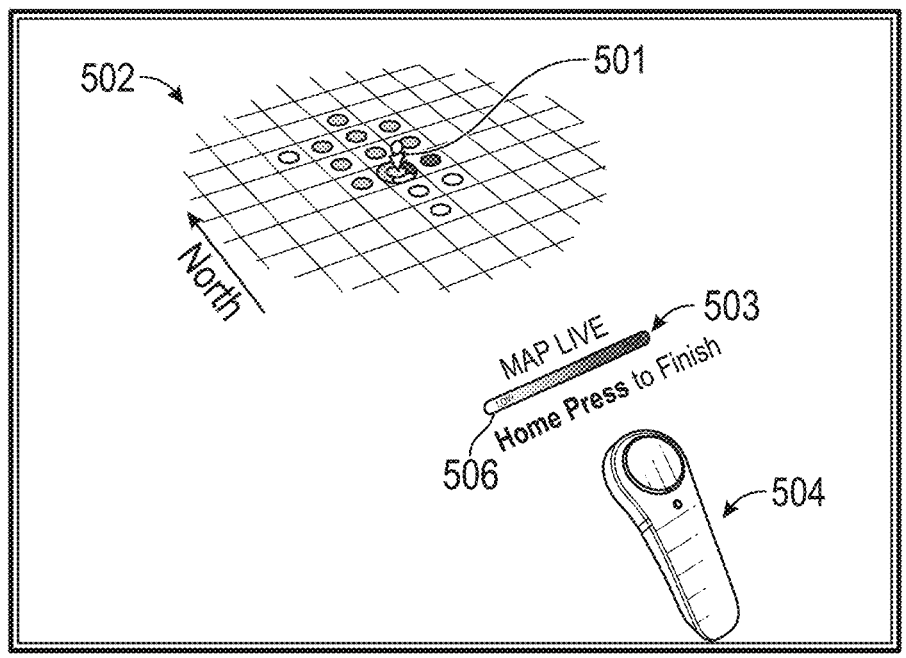
FIG. 5C illustrates an example map quality minimap, which may be configured to follow movements of a controller that is represented by a controller UI, such that the map quality minimap is easily accessible as the user moves throughout an environment.

FIG. 5C illustrates an example map quality minimap 502, which may be configured to follow movements of a controller (e.g., a handheld totem operated by the user) that is represented by a controller UI 504, such that the map quality minimap is easily accessible as the user moves throughout an environment. In some embodiments, any user input device or object, such as the users hand or a spoon may be used instead of a controller and may have its own associated UI. In general, the map quality minimap 502 indicates a current position of the user with user icon 501 in a center of the visualization and quality indicators for each of a plurality of cells around the user icon 501. In some implementations, the minimap 502 may have a "lazy" follow characteristic that causes it to follow the position of the controller, such as in the manner discussed in further detail in related U.S. Patent Application No. 62/965,708, titled "Content Movement and Interaction Using a Single Controller," filed Jan. 24, 2020, which is hereby incorporated by reference in its entirety for all purposes. In some embodiments, the minimap 502 may automatically rotate so that the user remains facing North, e.g., the minimap rotates/shifts depending on where the user is facing. The user may also have the option to maintain the minimap in a "North-up" orientation so that the orientation of the user icon 501 in the center of the minimap rotates while orientation of the minimap is not changed. In some embodiments, the minimap may be tilted up toward the user, such as based on a current headpose of the user. In embodiments where a controller UI is included in the visualization (e.g., controller UI 504 of FIG. 5C), the UI may be oriented for easy viewing by the user, such as at a predetermined adjustable tilt upward towards the user (e.g., a 10, 20, or 30 degree tilt).

In the example of FIG. 5C, additional map information 503 is displayed in association with controller UI 504. For example, a map status, indicating whether the map is "live" or "frozen" may be displayed. In some embodiments, the developer is provided an option to freeze (or lock) a map or portion of the map from further updates. For example, the user may provide a long trigger hold (e.g. for two seconds or more) or other designated input to freeze or unfreeze the map.

An overall map quality indicator 506 may also be displayed to the user, which may use colors (or other visualization effects in other embodiments) to indicate whether the map is currently of low quality (e.g., red), average quality (e.g., yellow), or high-quality (e.g., green). The additional map information 503 may also include tips or help on how to proceed with additional mapping or to exit the map curation process. FIG. 5C1 illustrates another view of the controller UI 504 and associated map information 503. In this example, the overall map quality indicator 506 is displayed at a three-dimensional Z position further away from the controller 504 than the mapping tips information 507.

FIG. 5C2 is a top view of the example minimap 502. In this example, the minimap 502 includes a defined radius of the map (e.g., the canonical and/or tracking map) about the current position of the user. In this example, each cell of the map is represented by a 27×27 mm cell and the radius of the minimap is 145 mm With these example dimensions, the minimap includes cell quality indicators for 4-5 cells in the North, South, West, and East directions from the central cell. In this example, the minimap fades away beginning at a particular distance from the outer radius, such as 115 mm in the example of FIG. 5C2. In other embodiments, other dimensions for cells and the minimap may be used, whether static or dynamic (e.g., adjustable by the user), and/or other visualizations of components of a minimap may be used.

Figure 5D:
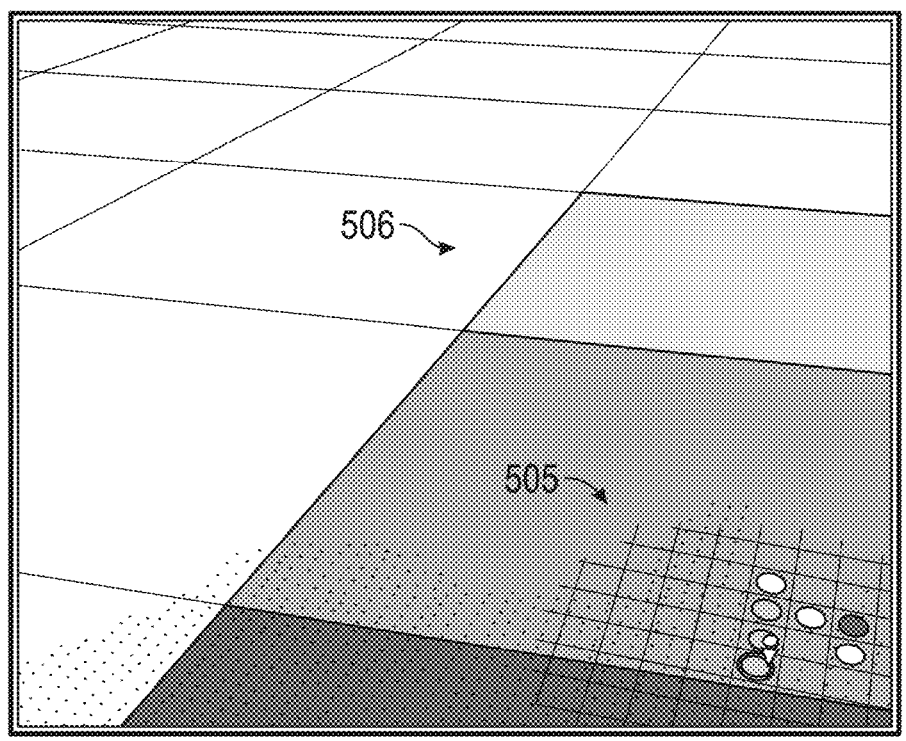
FIG. 5D illustrates an example map quality overlay that overlays the actual real-world area of the environment with color indicators of map quality within cells of the environment.

FIG. 5D illustrates an example map quality overlay 506 that overlays the actual real-world area of the environment with color indicators of map quality within cells of the environment. As shown in FIG. 5D, a map quality minimap 505 is displayed in conjunction with the map quality overlay 506. Thus, depending on the embodiment, one or both of the map quality minimap and/or map quality overlay may be displayed to a user as part of a map curation process.

Figure 5E:
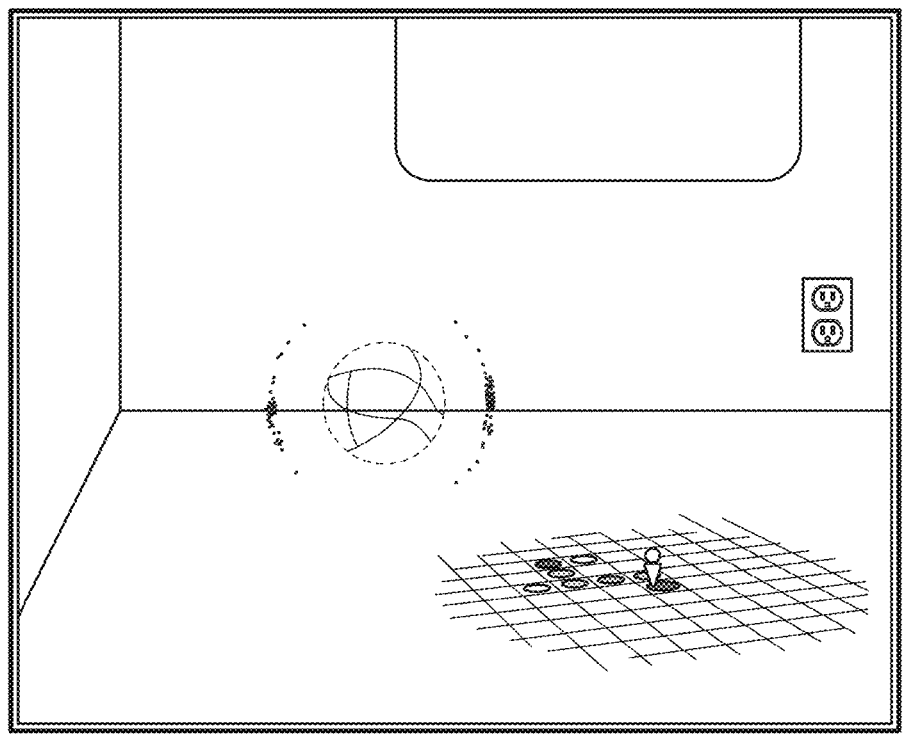
FIGS. 5E, 5F, and 5G are example user interfaces that include waypoint guidance animations.
Figure 5F:
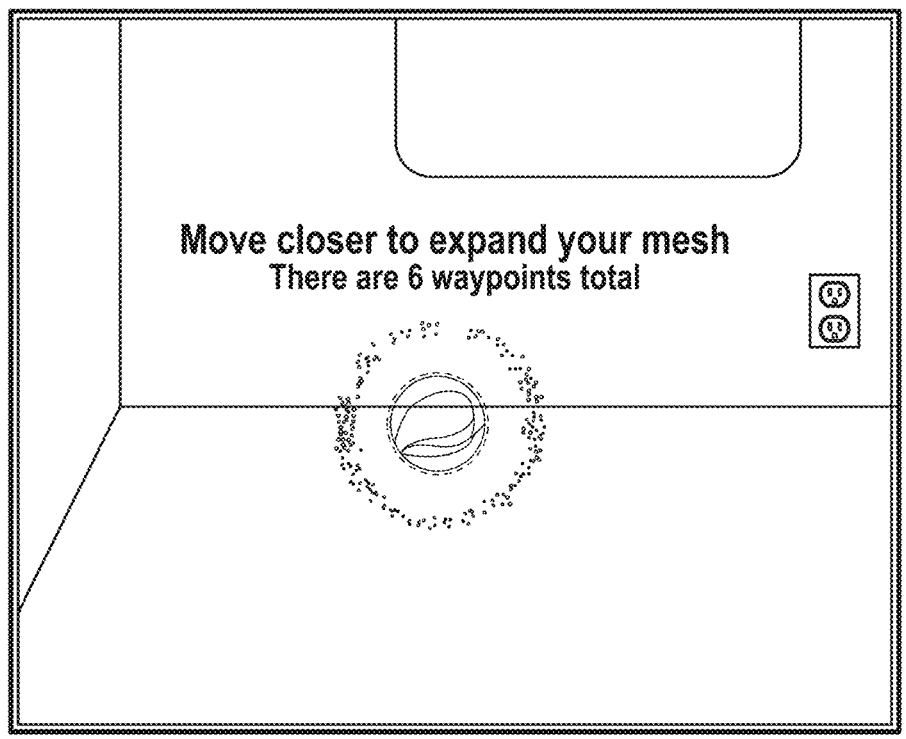
Figure 5G:
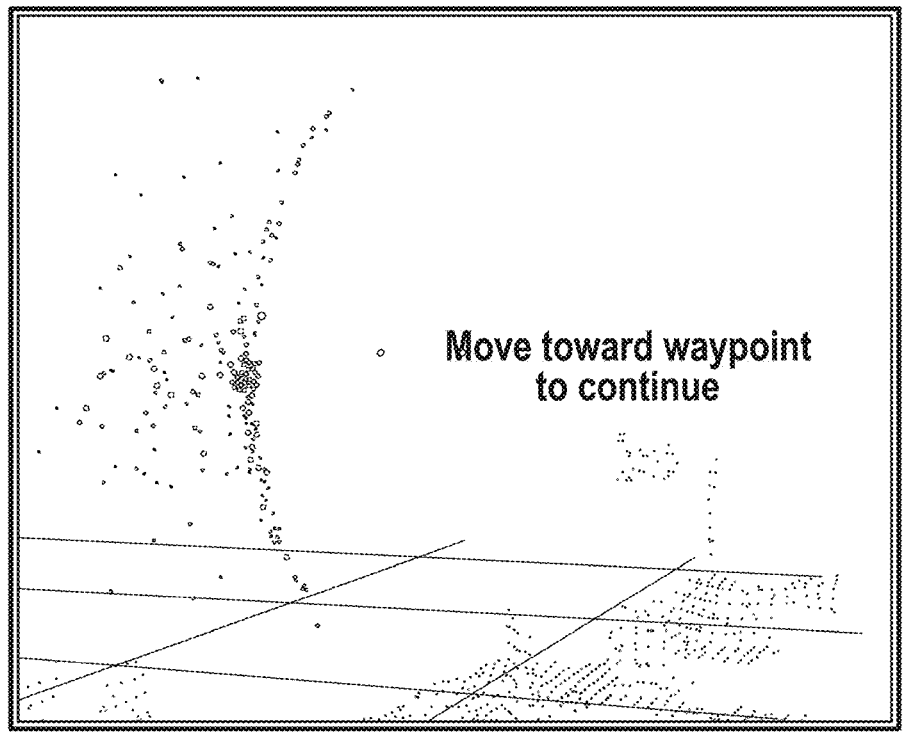

With reference to FIG. 5B again, the user may choose a guided setup option (e.g., the "Guided Setup" button in the user interface of FIG. 5B) to provide additional guidance in mapping an environment. In one example implementation, the guided setup provides the user with waypoint indicators, such as using gamified animations, to direct the user to areas of the map where additional images are needed. These additional guidance features may be provided in conjunction with, or independent of a map quality visualization. FIGS. 5E, 5F, and 5G are example user interfaces that include waypoint guidance animations. Related U.S. Patent Application No. 62/937,056 (MLEAP.285PR), titled "Mapping and Localization of a Passable World," filed on Nov. 18, 2019, provides further details regarding waypoint guidance, and is hereby incorporated by reference in its entirety for all purposes.

Returning to FIG. 5A, in some embodiments, a software developer 302 (FIG. 3) may perform some or all of the method of Figure SA, such as to collect initial map data associated with an environment (e.g., a real-world space to be mapped). In some embodiments, one or more other users 304 may perform some or all of the method of FIG. 5A, such as providing additional map data that can be used to update a canonical map and improve quality of the map (e.g., the "subsequent scans of environment" portion of the flowchart).

Beginning at block 510, an initial scan of an environment to be mapped may be acquired. For example, a developer (or other user) may use an AR device to acquire image data of an environment or area, such as an office space that does not yet have any data in a canonical map. In some implementations, the developer may obtain map data from other sources, such as using one or more LIDAR sensors (whether manually moved about the environment or automatically, e.g., robotically, moved throughout the environment). In some embodiment, the developer may walk around the environment to acquire images and/or other sensor data, that is usable to create a mesh of the environment. As the developer moves about the environment to be mapped, the AR system acquires image data along the movement path of the user that may be processed into one or more tracking maps. As used herein, a tracking map generally refers to a local map that is used by a particular AR system, although a tracking map may be shared among multiple users (e.g., at a common location) and, as discussed further below, may be used to generate and/or update a canonical map that is available to multiple users.

Moving to block 520, the map data acquired in block 510 is uploaded to a server, such as map server 310 (FIG. 3) where it may be processed for inclusion in a canonical map. For example, the server may receive map data from countless entities and process the map data to determine the most reliable map data to merge into a canonical map.

Next, at block 530 the map data is stitched and/or merged together to generate or update a canonical map, such as may be stored as canonical map 320 associated with the map server 310 (FIG. 3). Thus, a canonical map may originate as a tracking map. The canonical map may be persisted such that devices that access the canonical map may, once a transformation between their local coordinate system and a coordinate system of the canonical map has been performed, use the information in the canonical map to determine locations of objects represented in the canonical map in the physical world around the device. Thus, in some embodiments, the tracking map data received from the AR device may be used to generate an initial canonical map for the environment. The data stitching and merging may identify overlapping portions of images and common reference points within such images to improve quality of the map. As discussed below, subsequent map data may then be integrated into the canonical map, and the additional map data may improve the quality of the map.

The canonical maps, tracking maps, and/or other maps, may provide information about the portions of the physical world represented by the data processed to create respective maps. For example, a map may provide a floor plan of physical objects in a corresponding physical world. In some embodiments, map points may be associated with physical objects or features of physical objects (e.g., where a physical object includes multiple features). For example, each corner of a table may be a separate feature represented by separate points on a map (e.g., 4 map points associated with the 4 corners of the table). The features may be derived from processing images, such as may be acquired with the sensors of an AR device in an augmented reality system.

Continue to block 540, a user may then access the canonical map generated in block 530, such as via API communications with the map server 310 (FIG. 3). The user may be the developer or any other user. At block 550, the user obtains additional images of the environment for localizing the user within the environment. For example, when the user's AR device is activated, images from one or more cameras may be obtained and used to determine the user's location within the map. If localization does not immediately occur, the user may move about the environment, obtaining additional images, until localization within the canonical map occurs.

Next, at block 570, one or more map quality indicators are dynamically generated as the user moves about the environment further, and visual indicators of the map quality are provided to the user. Advantageously, such indicators are usable by the user to more efficiently move to areas of the map wherein additional images may provide the largest quality improvement.

Finally, at block 580, additional images acquired by the AR system are provided to the map server 310, which may they be analyzed and used to update the canonical map. Thus, in conjunction with the map quality interactivity noted above, obtaining additional map data that is useful in updating a canonical map can more efficiently be performed.

In some embodiments, as the user is interacting with the AR device through the process of FIG. 5A, a mesh of the mapped environment may be displayed and updated. In some embodiments, the mesh indicates portions of the map that are of low quality, and for which additional images would be useful in improving quality of the map (and, correspondingly, localization efficiency into that portion of the map). In other embodiments, the mesh may not be displayed to the user during some or all of the map curation process of FIG. 5A.

Figure 6:
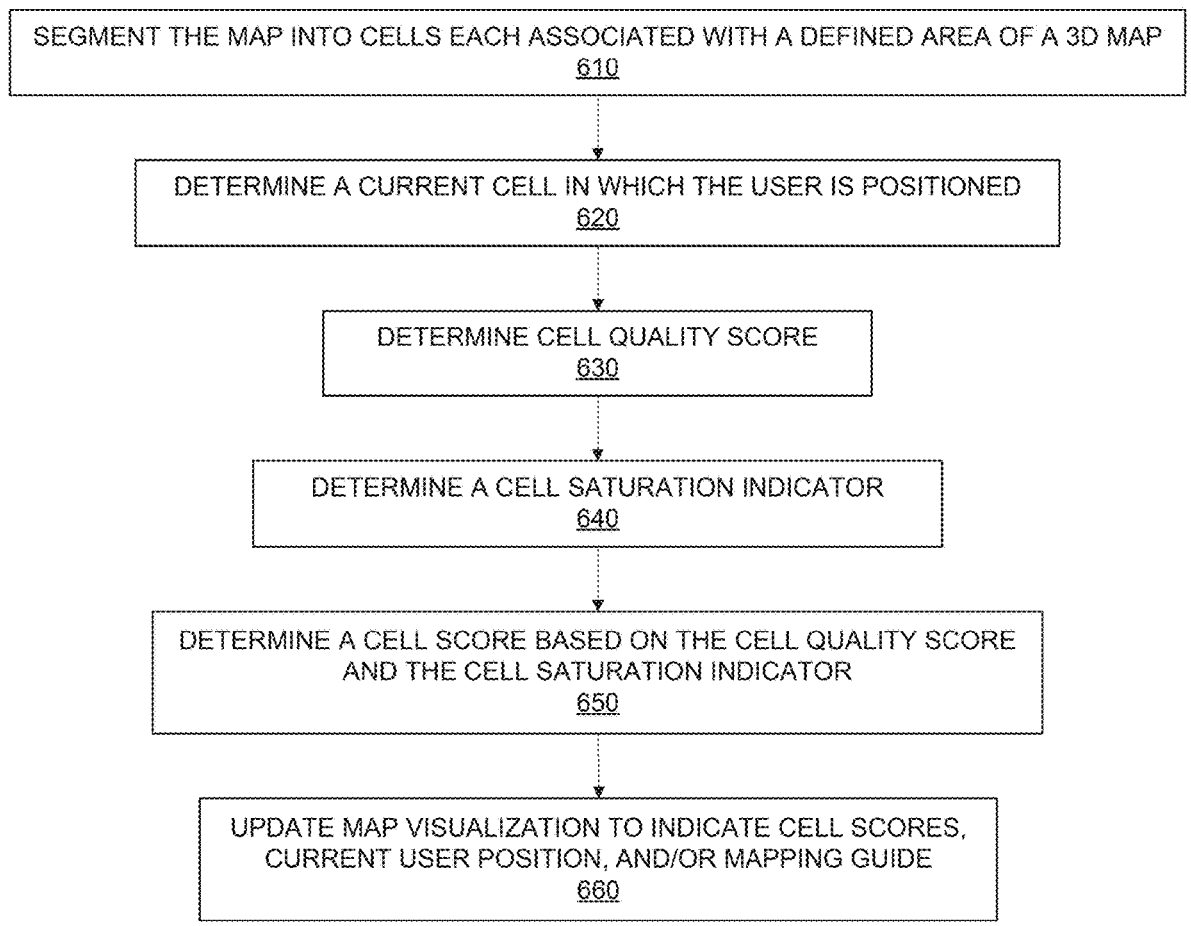
FIG. 6 is a flowchart illustrating one embodiment of a process for determining updates to map quality indicators.

FIG. 6 is a flowchart illustrating one embodiment of a process for determining updates to map quality indicators. In some implementations, a user of an AR device localizes with reference to the user's current environment using a localizing map, which may be a tracking map, a canonical map, and/or some combination of maps. Then real-time (e.g. one or more of the most recently captured) images obtained from the camera system of the AR device may be compared against the localizing map in an attempt to determine a location of the user within the map. The success of the localization depends on the quality of the localizing map. Thus, a metric of map quality, which indicates a likelihood of success for using the map for localization, may be advantageous. As discussed in further detail below, map quality metrics may be determined based on reference points captured in different images, such as an overall quantity of reference points and/or co-visibility of reference points among images. A reference point may be a map point representing a feature of interest, such as a corner, an edge, etc., wherein the feature of interest may be used to identify an object in an environment for localization purpose.

In the example of FIG. 6, a map is segmented into multiple cells, such as in a grid pattern, and each of the cells is scored to determine one or more quality indicators. In some embodiments, a grid of cells associated with a map may be referred to as a Pose Grid Block (or PGB). Advantageously, the cell quality scores may be generated dynamically, e.g., as the user moves about the environment, to provide real-time feedback to the user of improvements to the map quality for a current cell and/or indications of nearby cells which may benefit from additional map data.

Beginning at block 610, the map is segmented into multiple cells, each associated with a defined area of a real-world environment. Depending on the implementation, the map may be some or all of a canonical map associated with the environment into which the user is localized, such as may be transmitted to the AR system (from the map server 310) at the time of localization. For example, each of the cells may be associated with a predefined area of 4 m×4 m, 2 m×2 m, 1 m×1 m, or any other size or shape, of the real world environment.

Moving to block 620, a cell in which the user is currently located is determined, such as based on localization techniques discussed elsewhere herein.

Figure 7A:
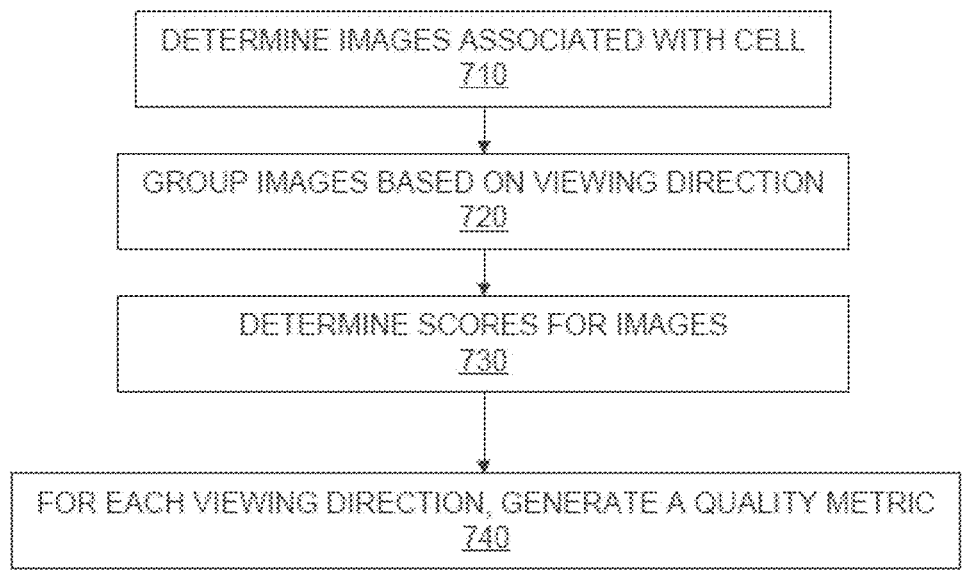
FIG. 7A is a flowchart illustrating one embodiment of a process of determining a cell quality score.

Next, at block 630, a cell quality score is determined for the cell in which the user is currently located (e.g. as determined in block 620). In one embodiment, cell quality subscores in the range of 0-1 are determined for each of multiple viewing directions of a cell. The cell quality score may then be determined based on the subscores, such as by averaging the subscores. For example, a cell that is divided into four viewing directions may have a corresponding four cell quality subscores in the range of 0-1 (or other range). The four subscores (e.g., 0.5, 0.6, 0.7, 0.25) may be averaged to obtain the cell quality score, e.g., (0.5+0.6+0.7+0.25)/4 results in a cell quality score of 0.5125. In other implementations, other score ranges may be used and overall cell quality scores may be calculated differently. For example, in some embodiments cell quality scores may be impacted by surrounding cells. For example, cell quality scores of cells in the north, south, west, and east directions to a current cell may be used in calculating the current cell quality score, such as by associating a weighting to each of the surrounding cell quality scores. In other embodiments, cells may be scored in other manners. Further examples of the scoring methodologies are described in further detail with reference to FIGS. 7A, which is a flowchart illustrating an example method of determining a cell quality score. Moving ahead to FIG. 7A, at block 710 the AR system and/or map server 310 (FIG. 3) determines images associated with the current cell (e.g., the 2 m×2 m area that the user is currently positioned in). The images may be stored locally, such as part of a tracking map, and/or may be obtained from the cloud (e.g., from the map server 310 of FIG. 3) responsive to a request for images associated with the current cell in a canonical map.

Figure 7B:
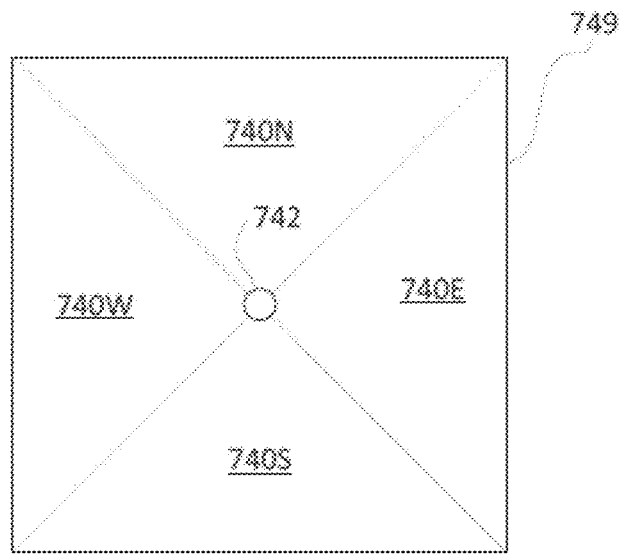
FIG. 7B illustrates an example cell.

Moving to block 720, the images identified in block 710 are grouped based on viewing direction and/or some other segmentation of cells. For example, each of the images may be associated with one of four viewing directions (e.g., North, South. East. and West; or up, down, left, and right). In other embodiments, other quantities and orientations of viewing directions may be used. In the example of FIG. 7B, an example cell 749 is illustrated. The example cell 749 includes four quadrants or viewing directions, with a user 742 positioned at the center of the cell.

Figure 7C:
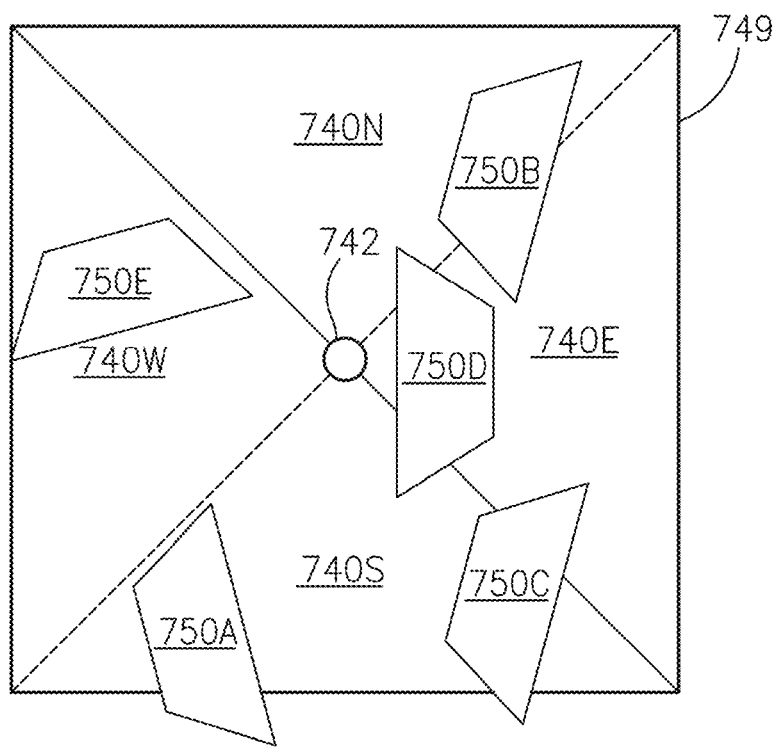
FIG. 7C illustrates the same example cell of FIG. 7B, now with multiple images superimposed on the corresponding viewing direction quadrant of the cell.

FIG. 7C illustrates the same cell 749, now with multiple images 750A-750E superimposed and positioned within the cell 749 from which the images were acquired (e.g., by another user or the current user within the cell). The image icons 750A-750E also indicate a viewing direction from which the images were acquired, where the viewing direction points from the narrower side towards the wider side (and beyond) of the icons 750. Thus in this example, images 750A, 750B, and 750C include content from an eastward viewing direction within the cell 749, e.g., images acquired from an imaging device within the cell 749 looking generally eastward, such as within some predetermined range of angles on either side of a due East direction. For example, if north is zero degree, south is 180 degrees, and east is 90 degrees, the range of viewing directions associated with an eastward viewing direction may be defined as between (90−X) and (90+X) where X is not more than 45. Similar viewing direction ranges may be determined for North, South, and West, with the same X value. However, in some implementations, X may be more than 45, e.g., 60, such that some images that are taking from a viewing angle between two directions may be included in two groupings of images. For example, in an embodiment with overlapping viewing direction areas, an image taken from a viewing angle of NorthEast may be included in both the North (740N) and the East (740E) image groupings. In some embodiments, other numbers of groups (e.g. 2, 3, 10, etc.), and/or other X values (1, 10, 80, etc.) may be used.

With further reference to FIG. 7C, image 750E includes content from a southward viewing direction and image 750D includes content from a westward viewing direction. Thus, after categorizing these example images, three images are associated with an eastward viewing direction (associated with grouping 740E of the cell 749), one image is associated with each of a westward grouping (740W) and southward grouping (740S), and no images are associated with a northward grouping (740N).

Determining viewing direction of images, and their corresponding viewing direction groupings, is not dependent on the particular location of the user in the cell, although the images may have been obtained from any position within the cell 749.

Returning to FIG. 7A, at block 730 an image score for each of the images is determined. For example, an image score may be based on a quantity of reference points included in the image. In some embodiments, the image scoring may be performed earlier in the process, such as prior to block 710. For example, images may be scored as they are received by the AR system and/or cloud server. In some embodiments, the image scores are normalized, such as with reference to a highest quantity of reference points in any image associated with a map. For example, if the maximum reference points in any image associated with the map is 10, an image with 2 reference points may be normalized to an image score of 0.20 and an image with 7 reference points may be normalized to an image score of 0.70. Use of normalized image scores may provide a more comprehensive view of the overall map quality than use of only the raw quantity of reference points in images.

Further description of scoring images, as well as grouping images based on viewing direction, may be found in U.S. patent application Ser. No. 16/520,582, titled "Methods and Apparatuses For Determining and/or Evaluating Localizing Maps Of Image Display Devices," which is hereby incorporated by reference in its entirety for all purposes.

Next, at block 740, for each viewing direction a cell quality subscore may be generated, such as based on the image scores of images associated with the particular viewing direction. Thus, with reference to example 7C, a cell quality subscore of nine (9) may be calculated for viewing direction group 740E based on the identification of three reference points in each of images 750A-750C (e.g., 3+3+3=9). In embodiments where image scores are normalized, the normalized scores may be used in calculating cell quality subscores. For example, if images 750A, 750B, 750C have normalized image scores of 0.7, 0.3, and 0.5, the cell quality subscore for group 740E may be the average of those normalized image scores, or 0.5.

In some embodiments, cell quality subscores may be further based on co-visibility of reference points within images of a particular viewing direction group. For example, a cell quality subscore of six (6) may be calculated for viewing direction group 740E if there are two (2) co-visible reference points in each of images 750A and 750B, three (3) co-visible reference points in each of images 750B and 750C, and one (1) co-visible reference point in each of images 750A and 750C (e.g., 2+3+1=6). In other embodiments, other variations of determining cell quality subscores may be used.

The cell quality score may then be calculated based on the cell quality subscores of a cell. For example, the four cell quality subscores may be averaged to determine a cell quality score. In some embodiments, cell quality scores may be normalized to a common range, such as 0-1, 0-10, or 0-100. For the purpose of illustration, cell quality scores in the range of 0-1 are discussed herein.

Returning to FIG. 6, with the cell quality score calculated, a cell saturation indicator is determined for the current cell. In one embodiment, the cell saturation indicator is based on the amount of time the user has been located in the current cell (e.g., within the 2 m×2 m area of the current cell). A numerical score may be determined, such as the number of seconds the user has been in the current cell, or in some embodiments an indicator of whether the current user has been in the cell more than a particular time period is determined. For example, a threshold time may be set to 10 seconds, such that if the user has been in the current cell for 10 seconds or more, the cell saturation indicator is positive (or one), while if the user has been in the cell less than 10 seconds, the cell saturation indicator is negative (or zero). In other embodiments, other threshold times may be used. In some embodiments, saturation subscores may be calculated for each of multiple viewing directions of a cell, such as the viewing directions for which cell quality subscores are generated (e.g., the four viewing directions 740N, 740S, 740W, 740E in FIG. 7C). A cell saturation score, which is a representation of multiple saturation subscores associated with a cell (e.g., a sum, average, weighted average, etc. of the subscores of the cell) may be calculated.

At block 650, an adjusted cell quality score (or a "cell score") is determined based on the cell quality score (block 630) and the cell saturation indicator (block 640). For example, the cell score may be based on the cell quality score and some enhancement if the cell saturation indicator is positive. For example, in one implementation if the cell quality score is less than a predetermined amount (e.g., 0.5), the cell score is determined as the cell quality score plus a 0.5 increase due to a positive cell saturation indicator. If the cell saturation indicator is negative, the cell score may be equal to the cell quality score. In other embodiments, the cell saturation indicator and cell quality score may be combined in different proportions to determine the cell score.

Moving to block 660, with the cell score calculated, an updated map visualization may be provided to the AR device to allow the user to visualize the cell scores. In some embodiments, cell scores are indicated using colors, such as red, orange, yellow, green, and/or gradients between such colors. For example, a cell score of one may result in a green indicator for the cell, while if the cell score is greater than or equal to 0.5, but less than one, a yellow indicator for the cell is displayed. Similarly, a cell score that is 0.25 or less may be indicated as red. Color gradients may be used to indicate more precisely where scores lie on the scale from zero-one. In another example, gradients of colors for scores may be determined based on a gradient between two colors, such as the color green for a score of one and the color red (orange) for a score of zero. As discussed earlier, the visualization may include a mapping guide that directs the user to areas of the environment in which cell scores are lower and for which additional images are desirable.

Figure 8:
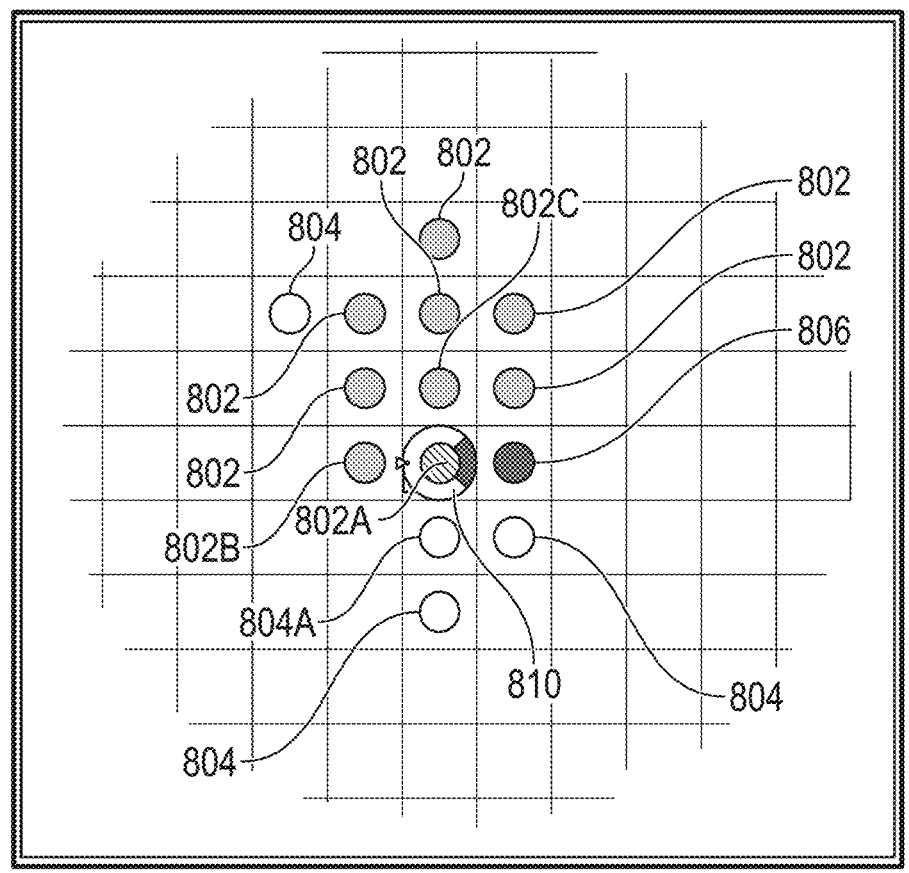
FIG. 8 is an example user interface of a minimap.

FIG. 8 is an example user interface of a minimap 800. In this example, the minimap 800 indicates several cells 802 with high cell scores (e.g., green circles), four cells 804 with moderate cell scores (e.g., yellow circles), and one cell 806 with a low cell score (e.g., red circles). Additionally, the cell the user is currently in, cell 802A, has a central portion colored orange, indicating an average or median score, such as where the directional score towards cell 806 is low (red), the directional score towards cell 804A is moderate (yellow), and directional scores in the other two directions are high (green).

As noted elsewhere herein, the range of values for ranking cell scores as high, moderate, low, and/or any other variation in between, may vary based on the implementation. Additionally, other colors may be used to represent cell score values and/or other visual indicators, such as associating the size of an object in each cell with a quality level (e.g., the cell is full when the score is highest and the cell includes only a dot or nothing at all in the center of the cell when the score is lowest). In some embodiments, such as the example of FIG. 8, colored dots are included only in cells that have some quality data present (e.g., cells that have a cell score). Because just stepping into a cell very briefly typically allows gathering of enough data to calculate a cell score (even though it may be a lower cell score), lack of a colored dot in this example may indicate that the user has not been in that cell.

In the example of FIG. 8, the current cell 802A indicates cell quality scores in each of four viewing directions, along with an overall cell score (e.g., orange) in the center of the cell 802A. Thus, the colors in the cell subscore ring 810 indicate cell quality subscores of green, red, yellow, and green (going clockwise starting with North) associated with quality of images obtained from that viewing direction from within cell 802A. In some embodiments, multiple directional quality indicators are calculated and stored for each cell, but only an overall cell score may be shown in cells outside of the current cell where the user is located. This may reduce complication of the user interface, while still providing an overall quality score for any cells for which scores have been determined.

In the embodiment of FIG. 8, if the user enters cell 804A, which is currently shown with a yellow dot, upon entering the cell the user icon would be positioned in cell 804A and the cell may be updated to show the four directional scores for cell 804A. For example, cell 804A may be associated with 3 green and 1 red directional quality indicators, but the user wouldn't know which direction each score is associated with until entering the cell 804A. Once the user enters the cell 804A (and the directional score indicators are indicated in cell 804A), if the red directional quality indicator is to the west, it would be indicated to the user to encourage the user to look to the west to obtain further images in that direction that could be used to improve quality of the map in that direction, and which would increase both the west quality subscore and the overall cell score.

In some embodiments, an overall map quality score may be calculated based on one or more of the cell scores of a map. For example, in one embodiment the overall map quality score is an average of the cell scores of all cells of the map. In another embodiment, the overall map quality score may be based on a quantity or proportion of cells of a map that have been assigned cell scores. For example, if a map includes 100 cells, but only 53 of the cells have an associated cell score, the overall map score may be 0.53 or 53%. In some embodiments, an overall map quality score may be calculated based on a portion of the map shown in the minimap (e.g., the cells directly around the user), rather than the entire map. The overall map quality score may be indicated in the associated map information 503, such as illustrated with reference to the controller UI 504 of FIG. 5.

FIGS. 9A-9E illustrate example user interfaces displayed to a user via an AR device as the user moves about an environment and obtains images that are used to improve a map quality. Beginning with FIG. 9A, a minimap 902 includes a user icon 901 in a center cell of the map. At this stage of the mapping process, the cell in which the user is currently positioned is the only cell that has been assigned a cell score, as indicated by the lack of colored circles in any other cells of the minimap 902. In this embodiment, the user interface also includes mesh 910 indicators in the form of white dots throughout a lower and right portion of the example user interface of FIG. 9A, indicating specific areas of the environment that have been meshed, and/or the extent of meshing of particular areas of the environment. Additional mapping information 903, including an overall map quality 906, is also displayed in this example, and indicates that the overall map quality is currently 0%.

Figure 9A:
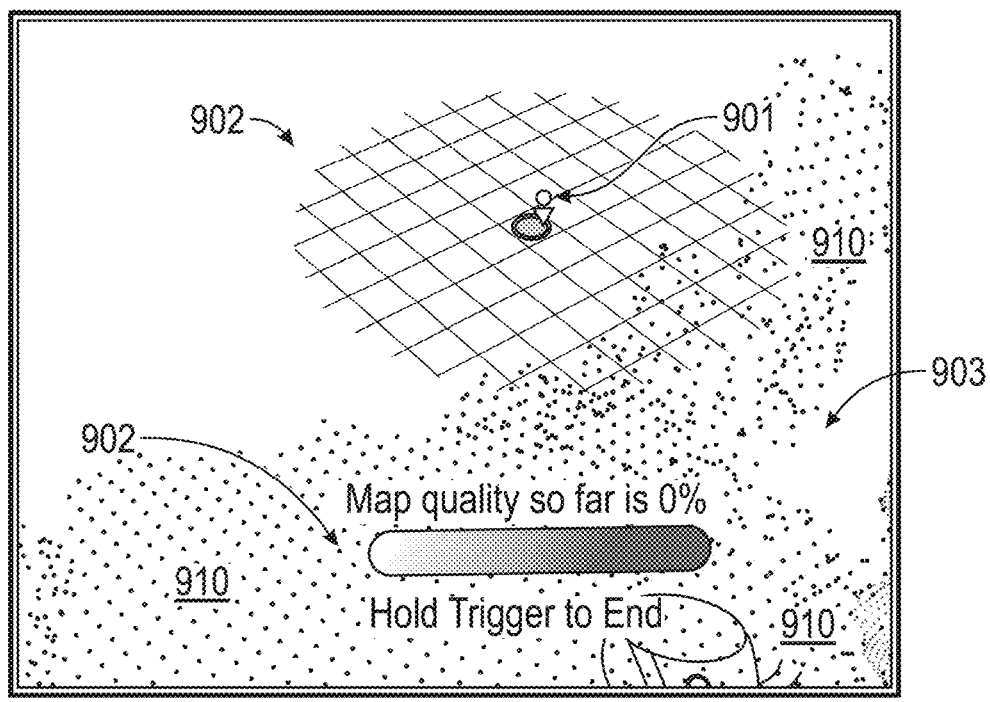
FIGS. 9A-9E illustrate example user interfaces displayed to a user via an AR device as the user moves about environment and obtains images that are used to improve a map quality.
Figure 9B:
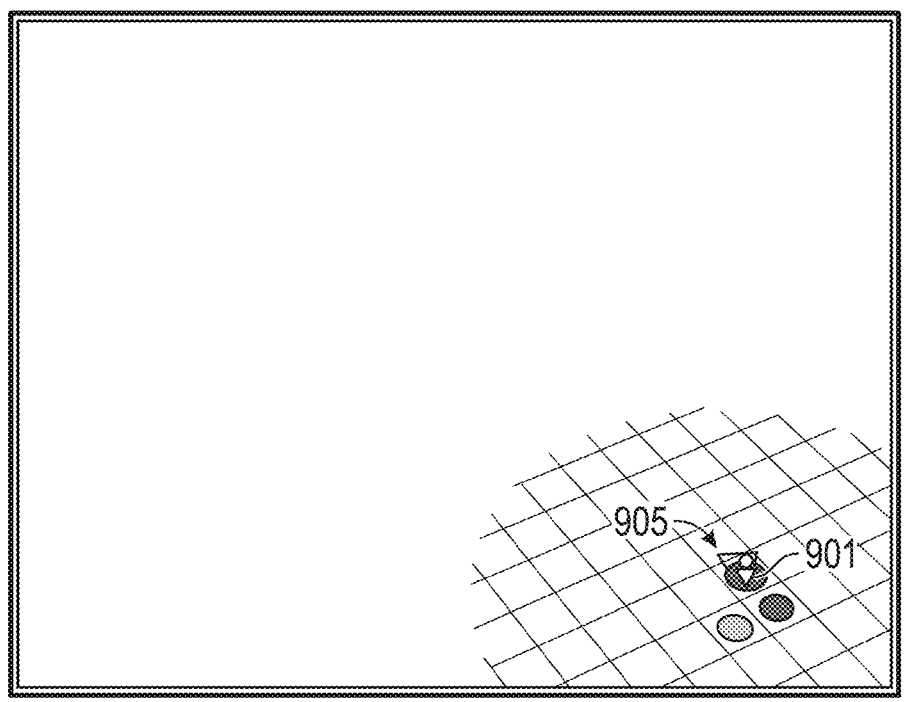
Figure 9C:
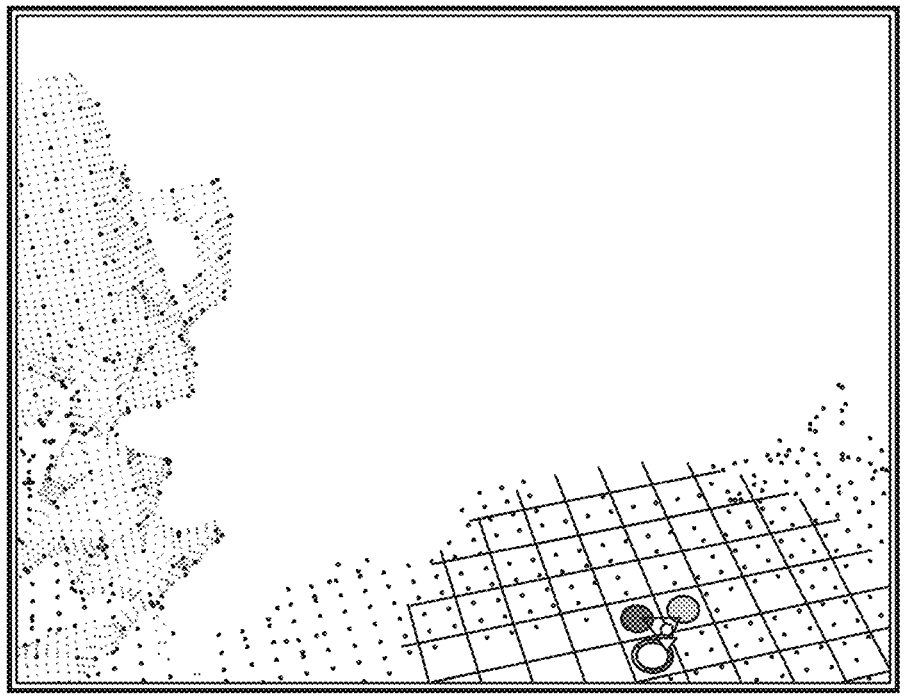
Figure 9D:
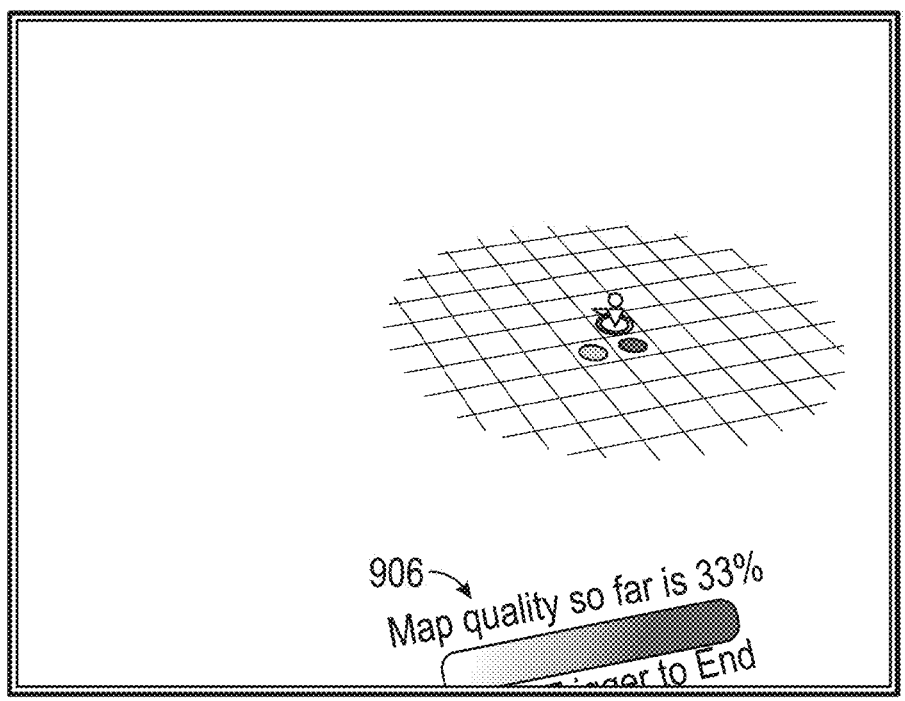
Figure 9E:
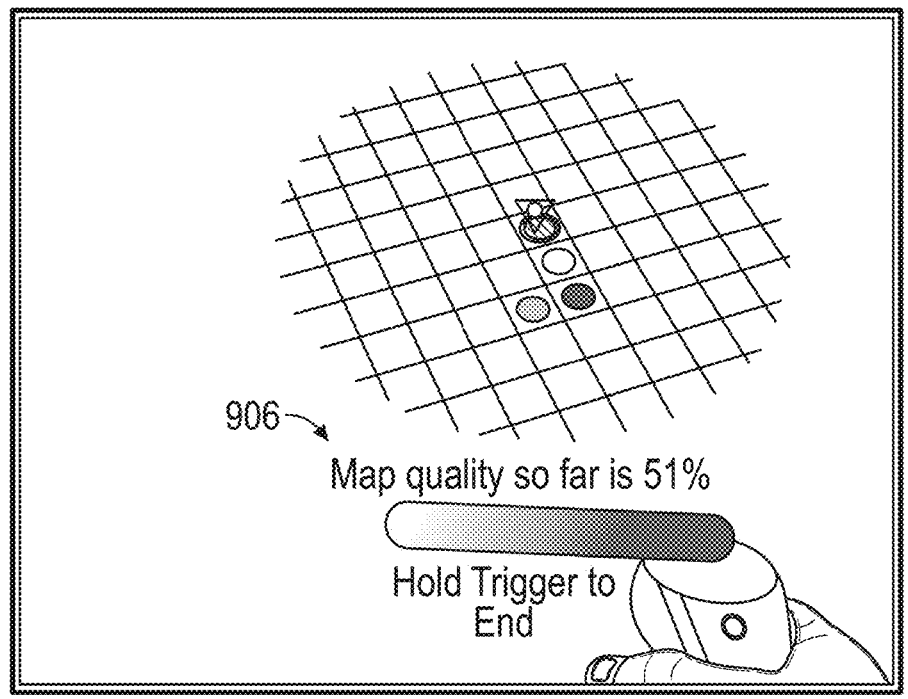

Moving to FIG. 9B, the user has moved into another cell and additional cell scores are shown. In some embodiments, cell scores are recalculated upon every map event, such as when a new image is acquired by the AR device or the user moves across the boundary of cells. As shown in the examples of FIG. 9, a viewing direction indicator 905 is shown next to the user icon 901 to help orient the user with reference to the minimap. The viewing indicator 905 advantageously shows the users real-time orientation. In other embodiments, orientation of the user may be displayed in other manners. FIG. 9C further illustrates how the minimap is updated in real time as the user moves about the environment. Similarly, the mesh indications are updated in real-time. FIG. 9D again shows the overall map indicator 906, but now with an indication that the map quality is 33%, due to the user moving about the environment to allow the system to develop cell scores for three cells. In FIG. 9E, the map quality indicator 906 indicates an increase to 51%, now with four cells having cell scores. Thus, the minimap provides immediate indications of improvement to the user, which may serve as motivation for the user to continue moving about the environment and obtaining additional image data.

EXAMPLE IMPLEMENTATIONS

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example One: A computerized method, performed by a computing system having one or more hardware computer processors and one or more non-transitory computer readable storage device storing software instructions executable by the computing system to perform the computerized method comprising: segmenting a digital map into a plurality of cells, each of the cells associated with a defined area of the digital map and a corresponding area of a real world environment, determining a cell in which a wearable headset is positioned; determining a cell quality score associated with the determined cell usable to localize a user into the determined cell, determining a cell saturation indicator indicative of whether the user has been positioned within the determined cell for at least a threshold time period, determining a cell score indicative of the cell quality score and the cell saturation score, updating a user interface viewable in the wearable headset to indicate the cell score for the determined cell.

Example Two: The computerized method of Example One, wherein the cell quality score and the cell saturation indicator are determined by a server remote to the wearable headset and are transmitted to the wearable headset via an application programming interface (API) communication channel.

Example Three: The computerized method of Example Two, wherein the wearable headset initiates the (API) communication channel by transmitting credentials for directly accessing map data from the remote server.

Example Four. The computerized method of Example One, wherein the cell quality score is between 0 and 1, wherein 0 indicates that the lowest cell quality and 1 indicates the highest cell quality.

Example Five: The computerized method of Example One, wherein if the cell saturation indicator is positive, the cell score is the sum of the cell quality score and 0.5, with a maximum cell score of one.

Example Six: The computerized method of Example One, wherein if the cell saturation indicator is negative, the cell score is the cell quality score.

Example Seven: The computerized method of Example One, wherein the user interface includes a minimap of a portion of the cells and their corresponding cell scores.

Example Eight: The computerized method of Example Seven, wherein the minimap is associated with a position of a user input device such that the minimap moves in conjunction with the user input device.

Example Nine. The computerized method of Example Eight, wherein the minimap is displayed in front of the user input device.

Example Ten: The computerized method of Example Seven, further comprising in response to movement of the user, the minimap rotates to maintain orientation of the user.

Example Eleven: The computerized method of Example One, wherein the user interface includes a map quality overlay with indicators of cell scores overlaying corresponding portions of the real world environment.

Example Twelve: The computerized method of Example One, wherein the user interface includes at least one cell quality subscore determined based on images obtained from a particular viewing directions.

Example Thirteen: The computerized method of Example Twelve, wherein the at least one cell quality subscore includes a north viewing direction subscore, a south viewing direction subscore, a west viewing direction subscore, and an east viewing direction subscore.

Example Fourteen: The computerized method of Example Thirteen, wherein the cell quality subscores are indicated in the current cell.

Example Fifteen: The computerized method of Example Fourteen, wherein the cell quality subscores are indicated as colored areas around an indicator of the cell score.

Example Sixteen: The computerized method of Example Seven, wherein the cell scores are indicated in the user interface with colors, wherein lower cell scores are a first color and higher cell scores are a second color.

Example Seventeen: The computerized method of Example Sixteen, wherein the first color is red and the second color is green.

Example Eighteen: The computerized method of Example Seven, wherein the user interface indicates the determined cell with a user icon.

Example Nineteen: The computerized method of Example One, wherein the plurality of cells are in a grid pattern.

Example Twenty: A computerized method, performed by a computing system having one or more hardware computer processors and one or more non-transitory computer readable storage device storing software instructions executable by the computing system to perform the computerized method comprising: accessing, via an application programming interface configured to communicate with a map server, map data associated with an environment of a wearable headset; displaying via the wearable headset a minimap indicating quality of the map data at each of a plurality of cells of the map, obtaining, via one or more sensors of the wearable headset, images of the environment as the user moves about the environment, determining updates to the quality of the map data based on the obtained images of the environment, updating the minimap to indicate the updates to the quality of the map data.

Example Twenty-one: The computerized method of Example Twenty, further comprising: transmitting, via the application programming interface, at least some of the images of the environment.

Example Twenty-two: The computerized method of Example Twenty, wherein the map server is configured to update a canonical map of the environment based on the images of the environment.

Example Twenty-three: The computerized method of Example Twenty-two, wherein the map server is further configured to receive images of the environment from one or more other users.

Example Twenty-four: The computerized method of Example Twenty, wherein the quality of the map is determined based on cell quality scores and saturation indicators for individual cells of the map.

Example Twenty-five: The computerized method of Example Twenty-four, wherein a cell quality scores and saturation indicator for a particular cell is determined while the user is in positioned in the particular cell.

Example Twenty-six. The computerized method of Example Twenty-four, further comprising: determining an overall map quality indicator based at least on cell quality scores for individual cells of the map.

As noted above, implementations of the described examples provided above may include hardware, a method or process, and/or computer software on a computer-accessible medium.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some implementations, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example implementations. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every implementation.

Conditional language used herein, such as, among others, "can," "could," "might," "may." "e.g.," and the like, unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without author input or prompting, whether these features, elements and/or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean one or more" or "at least one" unless specified otherwise.

As used herein, a phrase referring to "at least one of" a list of items refers to any combination of those items, including single members. As an example. "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain implementations require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A computerized method, performed by a computing system having one or more hardware computer processors and one or more non-transitory computer readable storage device storing software instructions executable by the computing system to perform the computerized method comprising:

determining a cell in which a wearable headset is positioned;

determining a cell quality score associated with the determined cell usable to localize a user into the determined cell;

determining a cell saturation indicator indicative of whether the user has been positioned within the determined cell for at least a threshold time period;

determining a cell score indicative of the cell quality score and the cell saturation-score indicator; and updating a user interface viewable in the wearable headset to indicate the cell score for the determined cell.

2. The computerized method of claim 1, wherein the cell quality score and the cell saturation indicator are determined by a server remote to the wearable headset and are transmitted to the wearable headset via an application programming interface (API) communication channel.

3. The computerized method of claim 2, wherein the wearable headset initiates the API communication channel by transmitting credentials for directly accessing map data from the remote server.

4. The computerized method of claim 1, wherein the cell quality score is between 0 and 1, wherein 0 indicates a lowest cell quality and 1 indicates a highest cell quality.

5. The computerized method of claim 1, further comprising:

in response to determining that the cell saturation indicator is positive, summing-the cell quality score and 0.5 to calculate the cell score, with a maximum cell score of 1.

6. The computerized method of claim 1, further comprising:

in response to determining that the cell saturation indicator is negative; setting the cell score equal to the cell quality score.

7. The computerized method of claim 1, wherein the user interface includes a minimap of a portion of a plurality of cells and their corresponding cell scores.

8. The computerized method of claim 7, wherein the minimap is associated with a position of a user input device such that the minimap moves in conjunction with the user input device.

9. The computerized method of claim 8, wherein the minimap is displayed in front of the user input device.

10. The computerized method of claim 7, further comprising:
in response to movement of the user, rotating the minimap to maintain orientation of the user.

11. The computerized method of claim 1, wherein the user interface includes a map quality overlay with indicators of cell scores overlaying corresponding portions of a real world environment.

12. The computerized method of claim 1, wherein the user interface includes at least one cell quality subscore determined based on images obtained from a particular viewing directions.

13. The computerized method of claim 12, wherein the at least one cell quality subscore includes a north viewing direction subscore, a south viewing direction subscore, a west viewing direction subscore, and an east viewing direction subscore.

14. The computerized method of claim 13, wherein the cell quality subscores are indicated in the determined cell.

15. The computerized method of claim 14, wherein the cell quality subscores are indicated as colored areas around an indicator of the cell score.

16. The computerized method of claim 7, wherein the cell scores are indicated in the user interface with colors, wherein lower cell scores are a first color and higher cell scores are a second color.

17. The computerized method of claim 16, wherein the first color is red and the second color is green.

18. The computerized method of claim 7, wherein the user interface indicates the determined cell with a user icon.

19. The computerized method of claim 1, wherein the cell is one of a plurality of cells in a grid pattern.

20. A computerized method, performed by a computing system having one or more hardware computer processors and one or more non-transitory computer readable storage device storing software instructions executable by the computing system to perform the computerized method comprising:
displaying via a wearable headset a minimap indicating quality of canonical map data at each of a plurality of cells of a canonical map, the quality of the canonical map data at each of the plurality of cells characterized by a cell quality score;
determining a cell in which the wearable headset is positioned;
determining a cell saturation indicator indicative of whether the wearable headset has been positioned within the determined cell for at least a threshold time period;
obtaining, via one or more sensors of the wearable headset, images of an environment as a user moves about the environment;
determining updates to the quality of the canonical map data based on the obtained images of the environment;
updating a cell score indicative of the cell quality score and the cell saturation indicator; and
updating the minimap to indicate the update to the cell score.

* * * * *

UNITED STATES PATENT AND TRADEMARK OFFICE
CERTIFICATE OF CORRECTION

| | |
|---|---|
| PATENT NO. | : 12,008,686 B2 |
| APPLICATION NO. | : 18/057615 |
| DATED | : June 11, 2024 |
| INVENTOR(S) | : Griffith Buckley Hazen et al. |

It is certified that error appears in the above-identified patent and that said Letters Patent is hereby corrected as shown below:

In the Claims

Column 24, Claim 1, Line 45:
"the cell saturation-score indicator; and"
Should read:
-- the cell saturation indicator; and --.

Signed and Sealed this
Sixth Day of August, 2024

Katherine Kelly Vidal
*Director of the United States Patent and Trademark Office*